(12) United States Patent
Holman et al.

(10) Patent No.: US 11,098,757 B2
(45) Date of Patent: Aug. 24, 2021

(54) CENTER BEARING ASSEMBLY

(71) Applicant: Dana Automotive Systems Group, LLC, Maumee, OH (US)

(72) Inventors: James L. Holman, Wauseon, OH (US); Bradley S. Jones, Waterville, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/578,485

(22) Filed: Sep. 23, 2019

(65) Prior Publication Data

US 2020/0102982 A1 Apr. 2, 2020

Related U.S. Application Data

(60) Provisional application No. 62/738,444, filed on Sep. 28, 2018.

(51) Int. Cl.
*F16C 27/06* (2006.01)
*B60K 17/24* (2006.01)

(52) U.S. Cl.
CPC ............ *F16C 27/066* (2013.01); *B60K 17/24* (2013.01); *F16C 2326/06* (2013.01)

(58) Field of Classification Search
CPC ........ F16C 23/06; F16C 27/06; F16C 27/066; F16C 35/077; F16C 2326/06; F16C 2361/31; F16C 35/047; F16C 2226/76; B60K 17/24
See application file for complete search history.

(56) References Cited

U.S. PATENT DOCUMENTS

| 2,687,926 | A | 8/1954 | Gair |
| 4,542,996 | A | 9/1985 | Brissette |
| 5,551,783 | A | 9/1996 | Whitney |
| 5,829,892 | A | 11/1998 | Groves |
| 6,379,048 | B1 | 4/2002 | Brissette |
| 6,520,678 | B2 * | 2/2003 | Aiken ..................... F16C 27/04 384/1 |
| 6,672,786 | B2 | 1/2004 | Schenk |
| 7,044,646 | B1 | 5/2006 | Aiken |
| 7,534,048 | B2 | 5/2009 | Holman |
| 8,475,052 | B2 * | 7/2013 | Ostrander ........... F16C 33/7896 384/484 |
| 9,677,605 | B2 | 6/2017 | Cheon |
| 2016/0084303 | A1 | 3/2016 | Ikeda |

* cited by examiner

*Primary Examiner* — James Pilkington
(74) *Attorney, Agent, or Firm* — Marshall & Melhorn, LLC

(57) ABSTRACT

A center bearing assembly for use in a motor vehicle. The center bearing assembly includes a cushion portion having an axially extending bearing aperture therein having a size and shape to receive and/or retain at least a portion of a bearing assembly therein. The cushion portion of the center bearing assembly has one or more first retention portions that are selectively engagable with one or more second retention portions of a bracket portion. When the one or more first retention portions of the cushion portion are engaged with the one or more second retention portions of the bracket portion, the cushion portion is prevented from being rotated relative to the bracket portion.

18 Claims, 15 Drawing Sheets

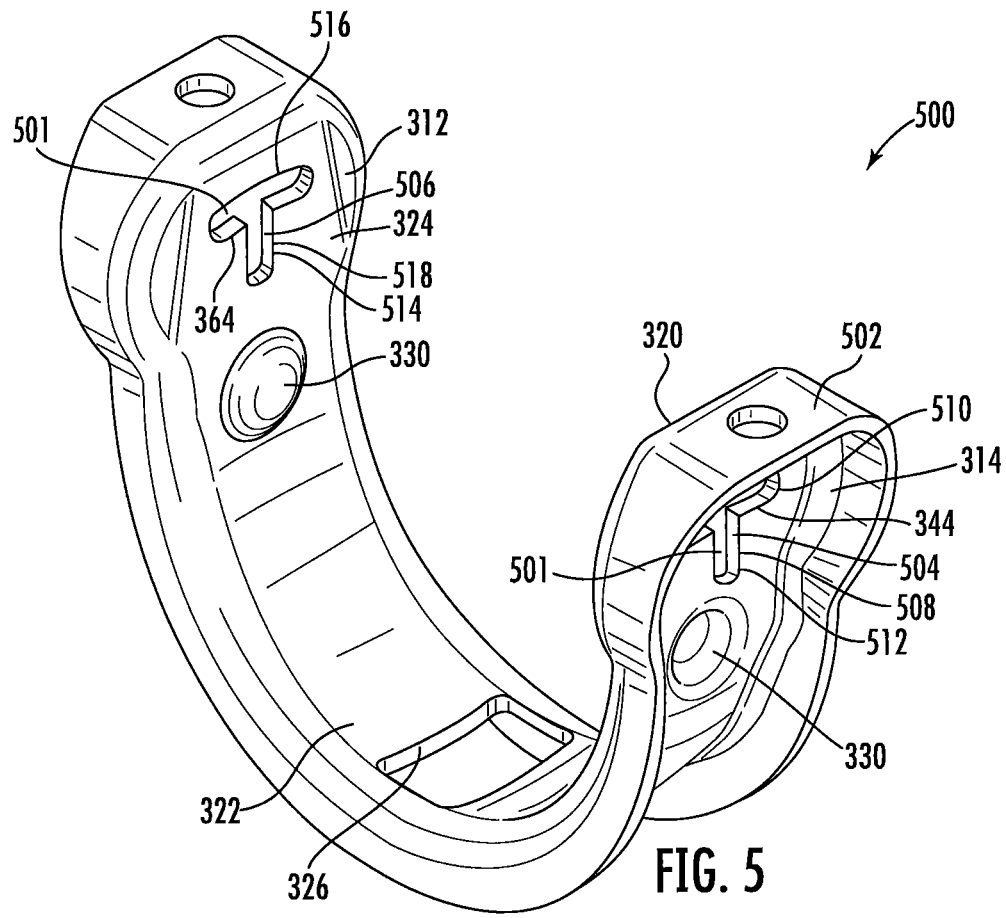
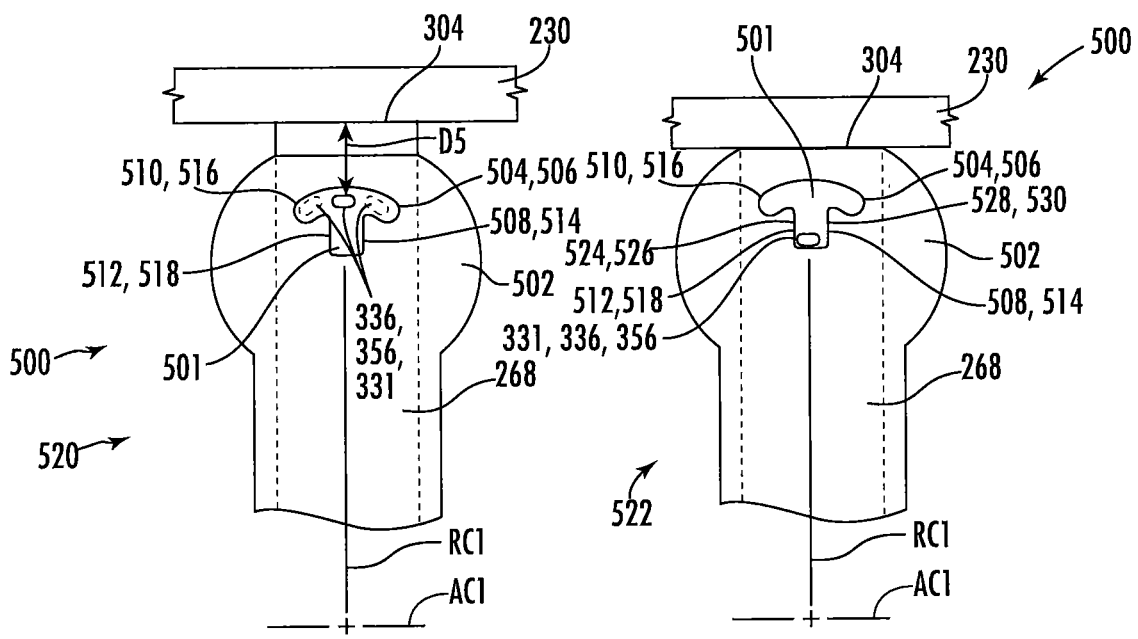
FIG. 5
FIG. 5A
FIG. 5B

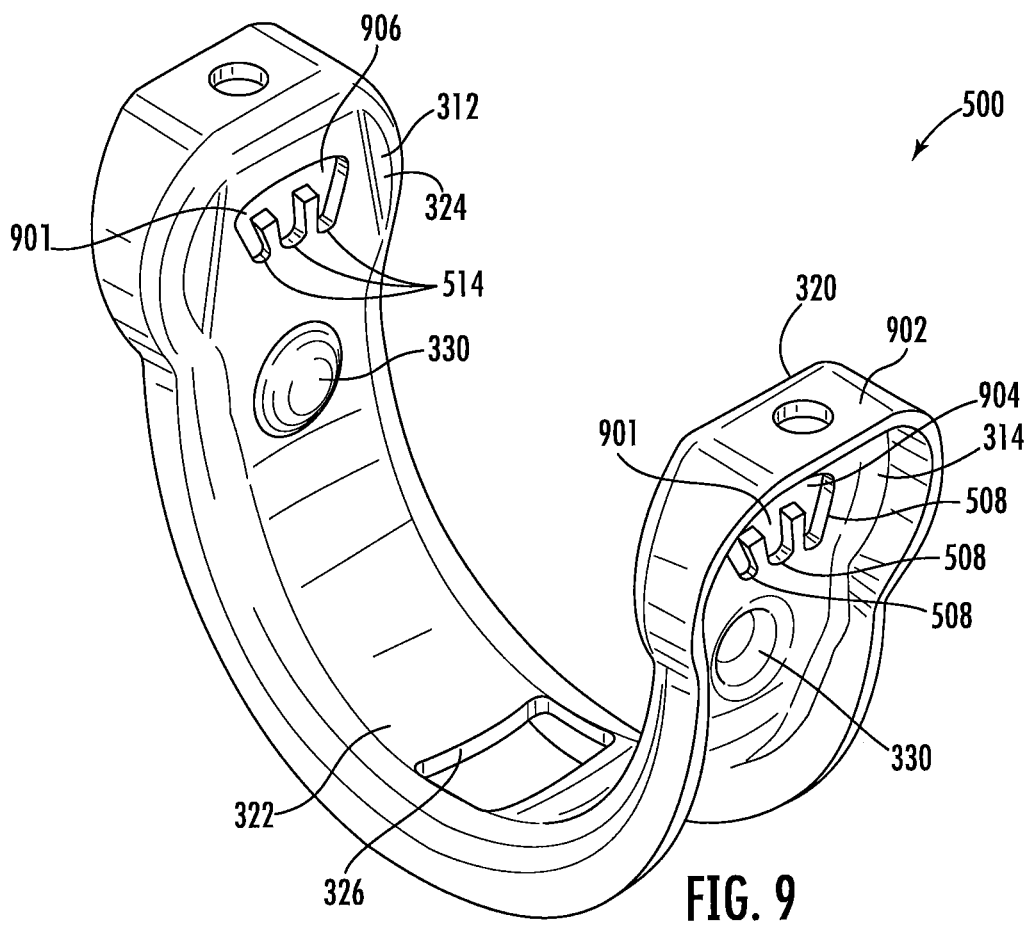
FIG. 9
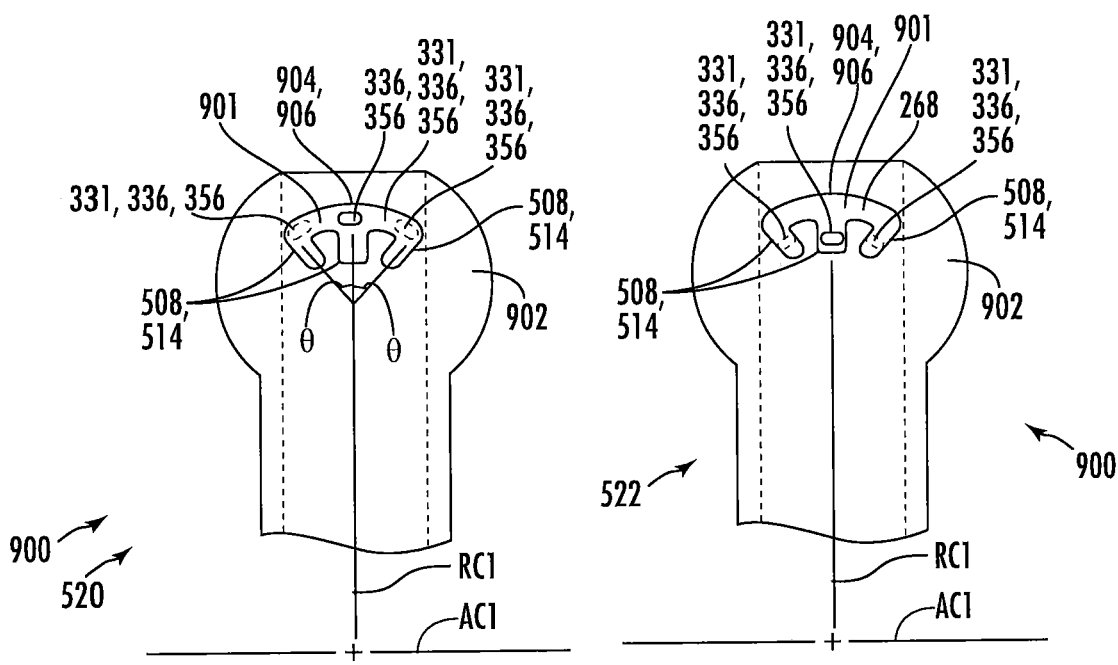
FIG. 9A
FIG. 9B

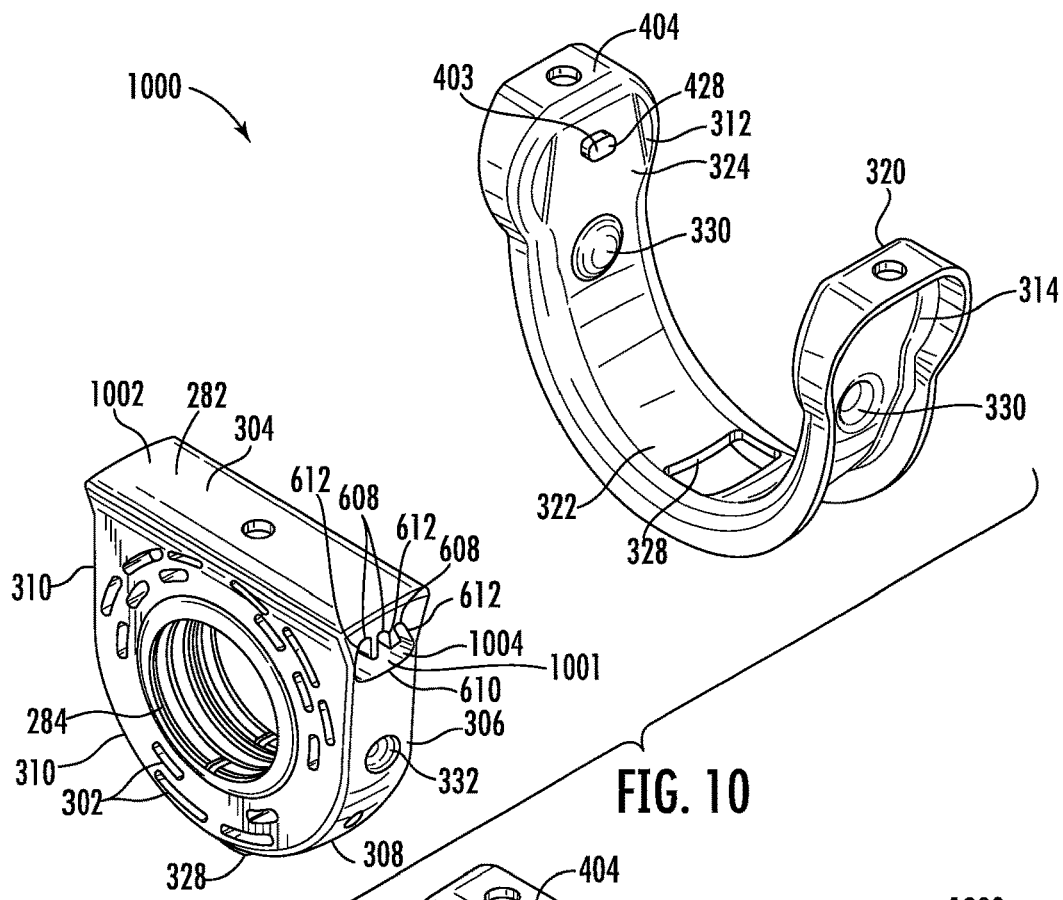
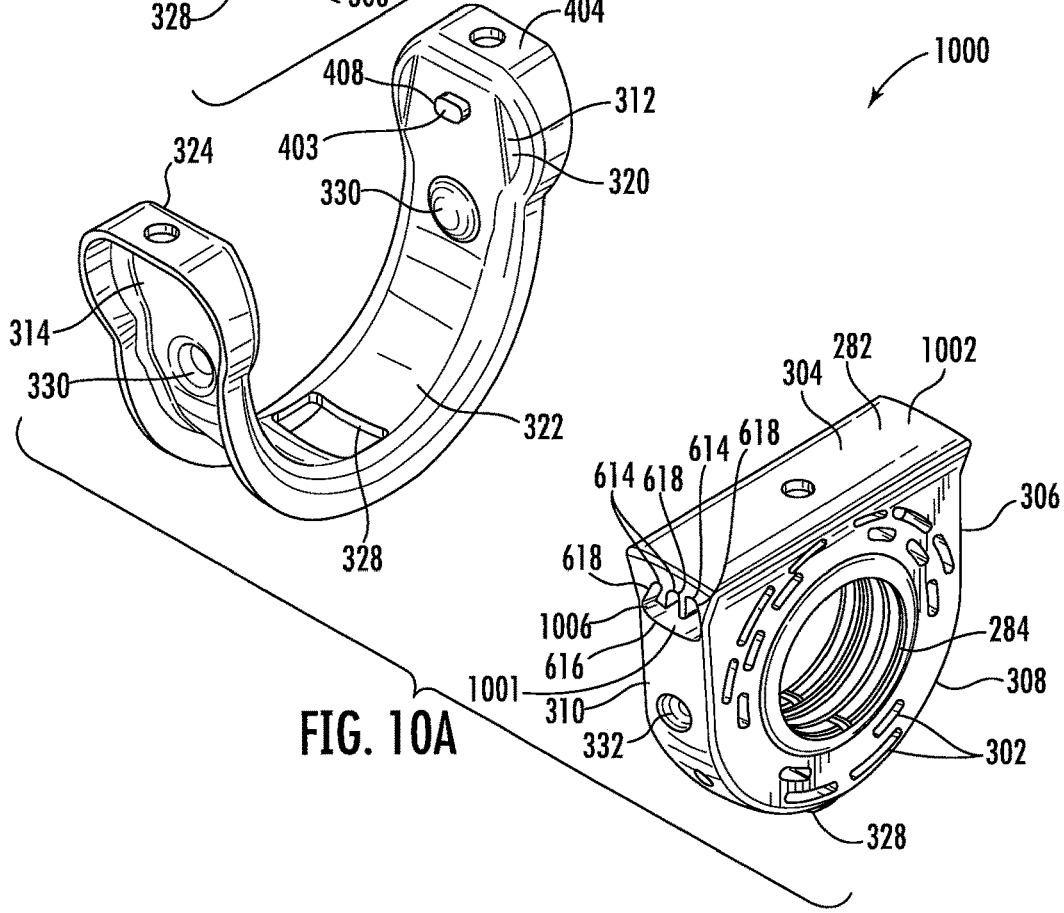

CENTER BEARING ASSEMBLY

CROSS-REFERENCE TO RELATED APPLICATIONS

The present application claims the benefit of U.S. Provisional Patent Application No. 62/738,444 filed on Sep. 28, 2018, which is incorporated herein by reference in its entirety.

FIELD OF THE DISCLOSURE

The present disclosure relates to a center bearing assembly for use in a motor vehicle.

BACKGROUND OF THE DISCLOSURE

Many conventional vehicles include a compound drive shaft assembly having two or more drive shafts that are connected to each other by using various joint assemblies. Typically, these conventional compound drive shaft assemblies require the use of a support structure in the form of a center bearing assembly. The center bearing assembly functions to provide rotational support for an intermediate portion of the compound drive shaft assembly. Conventional center bearing assemblies are rigid which makes assembling the compound drive shaft assembly difficult and often times results in damage to the center bearing assembly itself and/or other nearby components in the drive shaft assembly. Additionally, the conventional center bearing assemblies tend to suffer from an undesirable amount of cushion movement under various operating conditions resulting in an increased and/or an undesirable amount of noise, vibration and/or harshness (NVH) in the center bearing assembly and the other various components in the drive shaft assembly of the vehicle. This reduces the overall life and durability of the of the various components of the drive shaft assembly and results in a vehicle with poor ride characteristics.

It would therefore be advantageous to develop a center bearing assembly that is able to pivot making assembly of the drive shaft assembly of the vehicle easier. Additionally, it would be advantageous to develop a center bearing assembly that reduces and/or eliminates the overall amount of movement experienced by the cushion during operation of the vehicle thereby reducing and/or eliminating an amount of NVH in driveline and providing a vehicle with superior ride characteristics.

SUMMARY OF THE DISCLOSURE

A center bearing assembly for use in a motor vehicle. The center bearing assembly includes a cushion portion having an axially extending bearing aperture therein having a size and shape to receive and/or retain at least a portion of a bearing assembly therein. The cushion portion of the center bearing assembly has one or more first retention portions that are selectively engagable with one or more second retention portions of a bracket portion. When the one or more first retention portions of the cushion portion are engaged with the one or more second retention portions of the bracket portion, the cushion portion is prevented from being rotated relative to the bracket portion.

According to an aspect of the disclosure, the one or more first receiving portions and/or the one or more second receiving portions in the bracket portion may extend along a radius relative to a plane P1 that extends substantially perpendicular through an axial centerline AC1 of the bearing assembly.

According to any one of the previous aspects of the disclosure, the center bearing assembly may have first partially installed position and/or a second fully installed position. When in the first partially installed position, the one or more first and/or second extending portions on the cushion portion are not in direct contact with a bottom surface of the one or more first and/or second receiving portions in the bracket portion. When in the second fully installed position, at least a portion of a bottom surface of the one or more first and/or second extending portions on the cushion portion are in direct contact with at least a portion of the bottom surface of the one or more first and/or second receiving portions in the bracket portion thereby locking the cushion portion in place and preventing the cushion portion from rotating.

According to any one of the previous aspects of the disclosure, the one or more first and/or second extending portions on the cushion portion may be disposed a distance D1 and/or D2 from a first substantially horizontal surface of the outer peripheral surface of the cushion portion. As a result, when the cushion portion is compressed and in the second fully installed position, at least a portion of the bottom surface of the one or more first and/or second extending portions on the cushion portion may be in direct contact with at least a portion of the bottom surface of the one or more first and/or second receiving portions in the bracket portion.

According to any one of the previous aspects of the disclosure, the one or more first and/or second receiving portions in the bracket portion may further include one or more radially extending portions. The one or more radially extending portions of the one or more first and/or second receiving portions in the bracket portion may divide the one or more first and/or second receiving portions into one or more articulation portions and/or one or more locking portions.

According to any one of the previous aspects of the disclosure, the one or more first and/or second receiving portions in the bracket portion may be substantially T-shaped, substantially upside down T-shaped, substantially W-shaped, and/or substantially M-shaped.

According to any one of the previous aspects of the disclosure, the center bearing assembly may have a first partially installed position and a second fully installed position. When in the first partially installed position, at least a portion of the one or more first and/or second extending portions on the cushion portion may be disposed within at least a portion of the one or more articulation portions of the one or more first and/or second receiving portions in the bracket portion. When in the second fully installed position, at least a portion of the one or more first and/or second extending portions on the cushion portion may be disposed within at least a portion of the one or more locking portions of the one or more first and/or second receiving portions in the bracket portion thereby locking the cushion portion in place and preventing the cushion portion from rotating.

According to any one of the previous aspects of the disclosure, the one or more locking portions of the one or more first and/or second receiving portions in the bracket portion are disposed a distance from a first substantially horizontal surface of the outer peripheral surface of the cushion portion. As a result, when in a first partially installed position, at least a portion of the one or more first and/or second extending portions of the cushion portion may be disposed within at least a portion of the one or more articulation portions of the one or more first and/or second receiving portions in the bracket portion. Additionally, when in a second fully installed position at least a portion of the one or more first and/or second extending portions on the cushion portion may be disposed within at least a portion of the one or more locking portions of the one or more first and/or second receiving portions in the bracket portion.

According to any one of the previous aspects of the disclosure, the one or more first and/or second extending portions of the cushion portion may have one or more teeth extending outward therefrom. The one or more first and/or second receiving portions in the bracket portion may have one or more teeth that are complementary to and selectively engagable with at least a portion of the one or more teeth of the one or more first and/or second extending portions on the cushion portion.

According to any one of the previous aspects of the disclosure, the one or more teeth of the one or more first extending portions, the one or more second extending portions, the one or more first receiving portions and/or the one or more second receiving portions may have a substantially triangular shape, a substantially spherical shape, a substantially rectangular shape, a substantially square shape, a substantially semi-circular shape and/or a substantially egg shape.

A center bearing assembly having a cushion portion having an axially extending bearing aperture therein. The axially extending bearing aperture may be of a size and shape to receive and/or retain at least a portion of a bearing assembly therein. The cushion portion may have one or more first and/or second receiving portions extending inward from an outer peripheral surface of the cushion portion. The one or more first and second receiving portions in the cushion portion may be of a size and shape to receive and/or retain at least a portion of one or more first and/or second extending portions extending from at least a portion of an inner surface of a bracket portion.

According to the previous aspect of the disclosure, the one or more first receiving portions and/or the one or more second receiving portions in the cushion portion extend along a radius relative to a plane P1 that extends substantially perpendicular through an axial centerline AC1 of the bearing assembly.

According to any one of the previous aspects of the disclosure, the center bearing assembly may have a first partially installed position and/or a second fully installed position. When in the first partially installed position, the one or more first and/or second extending portions on the bracket portion may not in direct contact with a top surface of the one or more first and/or second receiving portions in the cushion portion. When in a second fully installed position, at least a portion of a top surface of the one or more first and/or second extending portions on the bracket portion may be in direct contact with at least a portion of the top surface of the one or more first and/or second receiving portions in the cushion portion thereby locking the cushion portion in place and preventing the cushion portion from rotating.

According to any one of the previous aspects of the disclosure, the one or more first and/or second extending portions on the bracket portion may be disposed a distance D3 and/or D4 from a first substantially horizontal surface of the outer peripheral surface of the cushion portion. As a result, when the cushion portion is compressed and in the second fully installed position, at least a portion of the top surface of the one or more first and/or second extending portions on the bracket portion may be in direct contact with at least a portion of the top surface of the one or more first and/or second receiving portions in the cushion portion.

According to any one of the previous aspects of the disclosure, the one or more first and/or second receiving portions in the cushion portion may further include one or more radially extending portions. The one or more radially extending portions of the one or more first and/or second receiving portions in the cushion portion divides the one or more first and/or second receiving portions into one or more articulation portions and/or one or more locking portions.

According to any one of the previous aspects of the disclosure, the one or more first and/or second receiving portions in the cushion portion may be substantially T-shaped, substantially upside down T-shaped, substantially W-shaped, and/or substantially M-shaped.

According to any one of the previous aspects of the disclosure, the bearing assembly may have a first partially installed position and a second fully installed position. When in the first partially installed position, at least a portion of the one or more first and/or second extending portions on the bracket portion may be disposed within at least a portion of the one or more articulation portions of the one or more first and/or second receiving portions in the cushion portion. When in the second fully installed position, at least a portion of the one or more first and/or second extending portions on the bracket portion may be disposed within at least a portion of the one or more locking portions of the one or more first and/or second receiving portions in the cushion portion thereby locking the cushion portion in place and preventing the cushion portion from rotating.

According to any one of the previous aspects of the disclosure, the one or more locking portions of the one or more first and/or second receiving portions in the cushion portion may be disposed a distance from a first substantially horizontal surface of the outer peripheral surface of the cushion portion. As a result, when in a first partially installed position at least a portion of the one or more first and/or second extending portions of the bracket portion may be disposed within at least a portion of the one or more articulation portions of the one or more first and/or second receiving portions in the cushion portion. Additionally, when in a second fully installed position at least a portion of the one or more first and/or second extending portions on the bracket portion may be disposed within at least a portion of the one or more locking portions of the one or more first and/or second receiving portions in the cushion portion.

According to any one of the previous aspects of the disclosure, the one or more first and/or second extending portions of the bracket portion may have one or more teeth extending outward therefrom. The one or more first and/or second receiving portions in the cushion portion may have one or more teeth that are complementary to and selectively engagable with at least a portion of the one or more teeth of the one or more first and/or second extending portions on the bracket portion.

According to any one of the previous aspects of the disclosure, the one or more teeth of the one or more first extending portions, the one or more second extending portions, the one or more first receiving portions and/or the one or more second receiving portions may have a substantially triangular shape, a substantially spherical shape, a substantially rectangular shape, a substantially square shape, a substantially semi-circular shape and/or a substantially egg shape.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 is a schematic perspective view of a portion of a center bearing assembly according to another embodiment of the disclosure;

FIG. 5A is a cut-away schematic side-view of a portion of the center bearing assembly illustrated in FIG. 5 of the disclosure when the center bearing assembly is in a partially installed position;

FIG. 5B is a cut-away schematic side-view of a portion of the center bearing assembly illustrated in FIGS. 5 and 5A of the disclosure when the center bearing assembly is in a fully installed position;

FIG. 7 C is a schematic detailed view of a portion of the center bearing assembly illustrated in FIGS. 7-7B of the disclosure when the center bearing assembly is a fully installed position;

FIG. 9 is a schematic perspective view of a portion of a center bearing assembly according to still even yet another embodiment of the disclosure;

FIG. 9A is a cut-away schematic side-view of a portion of the center bearing assembly illustrated in FIG. 9 of the disclosure when the center bearing assembly is in a partially installed position;

FIG. 9B is a cut-away schematic side-view of a portion of the center bearing assembly illustrated in FIGS. 9 and 9A of the disclosure when the center bearing assembly is in a fully installed position;

FIG. 10 is a schematic perspective exploded view of a center bearing assembly according to a further embodiment of the disclosure; and FIG. 10A is a schematic perspective exploded view of the center bearing assembly illustrated in FIG. 10 of the disclosure.

DETAILED DESCRIPTION OF THE DISCLOSURE

It is to be understood that the device and/or method described herein may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the center bearing assembly disclosed herein may be used in automotive, off-road vehicle, all-terrain vehicle, construction, structural, marine, aerospace, locomotive, military, machinery, robotic and/or consumer product applications. Additionally, as a non-limiting example, the center bearing assembly disclosed herein may also be used in passenger vehicle, electric vehicle, hybrid vehicle, commercial vehicle, autonomous vehicles, semi-autonomous vehicles and/or heavy vehicle applications.

Figure 1:
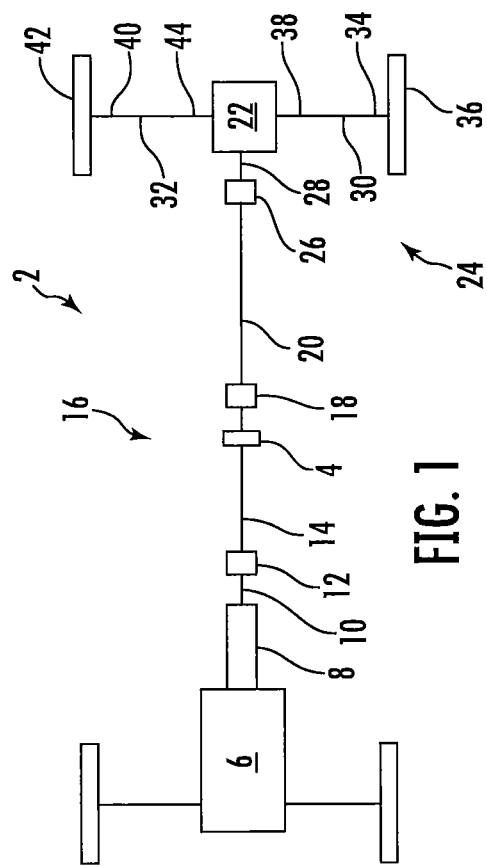
FIG. 1 is a schematic top-plan view of a vehicle having one or more center bearing assemblies according to an embodiment of the disclosure.

FIG. 1 is a schematic top-plan view of a vehicle 2 having one or more center bearing assemblies 4 according to an embodiment of the disclosure. The vehicle 2 has an engine 6 which is drivingly connected to an end of a transmission 8. A transmission output shaft 10 is drivingly connected to an end of the transmission 8 opposite the engine 6. The transmission 8 is a power management system which provides controlled application of the rotational power generated by the engine 6 by means of a gear box.

An end of the transmission output shaft 10 opposite the transmission 8 is drivingly connected to an end of a first joint assembly 12. The first joint assembly 12 is a joint or coupling assembly that allows rotational energy to be transferred between shafts having a variable axis. It is within the scope of this disclosure and as a non-limiting example that the first joint assembly 12 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

Drivingly connected to an end of the first joint assembly 12, opposite the transmission output shaft 10, is a first shaft 14. It is within the scope of this disclosure and as a non-limiting example that the first shaft 14 may be a propeller shaft, a drive shaft, a cardan shaft, a double cardan shaft, a universal joint shaft, a Hooke's joint shaft or any other shaft in a drivetrain assembly 16 that is used to transmit the rotational energy generated by the engine 6 to the drive wheel(s) of the vehicle 2. An end of the first shaft 14, opposite the first joint assembly 12, may be drivingly connected to a second joint assembly 18. As a non-limiting example, the second joint assembly 18 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

As illustrated in FIG. 1 of the disclosure and as a non-limiting example, at least a portion of an end of the first shaft 14, opposite the first joint assembly 12, may be supported by the one or more center bearing assemblies 4 according to an embodiment of the disclosure. The one or more center bearing assemblies 4 provide an amount of radial and axial support for at least a portion of the first shaft 14 of the drivetrain assembly 16, while at the same time providing rotational support for the first shaft 14 of the vehicle 2. It is therefore to be understood that the one or more center bearing assemblies 4 aid in increasing the overall life and durability of the various components of the drivetrain assembly 16 of the vehicle 2.

Drivingly connected to an end of the second joint assembly 18, opposite the first shaft 14, is an end of a second shaft 20 of the drivetrain assembly 16 of the vehicle 2. It is within the scope of this disclosure and as a non-limiting example that the second shaft 20 may be a propeller shaft, a drive shaft, a cardan shaft, a double cardan shaft, a universal joint shaft, a Hooke's joint shaft or any other shaft in a drivetrain assembly 16 that is used to transmit the rotational energy generated by the engine 6 to the drive wheel(s) of the vehicle 2. An end of the second shaft 20, opposite the second joint assembly 18, may be drivingly connected to at least a portion of a rear axle differential assembly 22 of a rear axle system 24 of the vehicle 2. The rear axle differential assembly 22 is a set of gears that allows the outer drive wheel(s) to rotate at a faster rate than the inner drive wheel(s) of the vehicle 2.

According to an embodiment of the disclosure and as a non-limiting example, at least a portion of the end of the second shaft 20, opposite the second joint assembly 18, may be drivingly connected to a third joint assembly 26 which in turn is drivingly connected to at least a portion of the rear axle differential assembly 22 of the vehicle 2. As illustrated in FIG. 1 of the disclosure and as a non-limiting example, at least a portion of an end of a third shaft 28 may drivingly connect an end of the third joint assembly 26, opposite the second shaft 20. Additionally, as illustrated in FIG. 1 of the disclosure and as a non-limiting example, at least a portion of an end of the third shaft 28, opposite the third joint assembly 26, may be drivingly connected to at least a portion of the rear axle differential assembly 22 of the vehicle 100. It is within the scope of this disclosure and as a non-limiting example that the third shaft 28 may be a differential input shaft, a rear axle system input shaft, a pinion gear shaft or any other type of shaft that provides an amount of rotational power to the rear axle differential assembly 22 of the vehicle 2. Additionally, it is within the scope of this disclosure and as a non-limiting example that the third joint assembly 26 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

In accordance with an embodiment of the disclosure and as a non-limiting example, the drivetrain assembly 16 may include one or more second center bearing assemblies (not shown) according to an embodiment of the disclosure. The one or more second center bearing assemblies (not shown) of the drivetrain assembly 16 of the vehicle 2 may be in direct contact with and provide support for an end of the second shaft 20, opposite the third joint assembly 26. The one or more second center bearing assemblies (not shown) provide an amount of radial and axial support for at least a portion of the second shaft 20 of the drivetrain assembly 16, while at the same time provide rotational support for the second shaft 20. It is within the scope of this disclosure and as a non-limiting example that the one or more second center bearing assemblies (not shown) may be used in combination with or in place of the one or more center bearing assemblies 4 illustrated in FIG. 1 of the disclosure.

The rear axle system 24 of the vehicle 2 further includes a first rear axle half shaft 30 and a second rear axle half shaft 32. The first rear axle half shaft 30 extends substantially perpendicular to the third shaft 28. At least a portion of a first end portion 34 of the first rear axle half shaft 30 may be drivingly connected to at least a portion of a first rear axle wheel end assembly 36 and at least a portion of a second end portion 38 of the first rear axle half shaft 30 may be drivingly connected to a side of the rear axle differential assembly 22.

Extending substantially perpendicular to the third shaft 28 is the second rear axle half shaft 32 of the vehicle 2. At least a portion of a first end portion 40 of the second rear axle half shaft 32 may be drivingly connected to at least a portion of a second rear axle wheel end assembly 42. Additionally, at least a portion of a second end portion 44 of the second rear axle half shaft 32 may be drivingly connected to an end of the rear axle differential assembly 22, opposite the first rear axle half shaft 30 of the vehicle 2.

Figure 2:
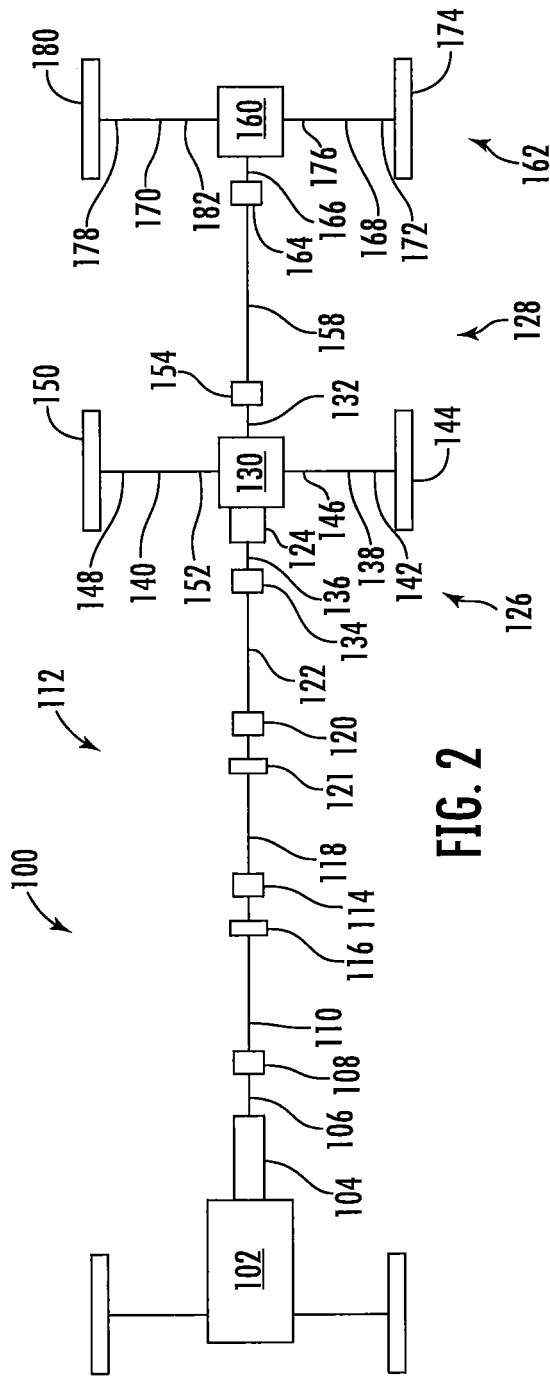
FIG. 2 is a schematic top-plan view of another vehicle having one or more center bearing assemblies according to an embodiment of the disclosure.

FIG. 2 is a schematic top-plan view of another vehicle 100 having one or more center bearing assemblies according to an embodiment of the disclosure. As illustrated in FIG. 2 of the disclosure and as a non-limiting example, the vehicle 100 has an engine 102 which is drivingly connected to an end of a transmission 104. A transmission output shaft 106 is drivingly connected to an end of the transmission 104, opposite the engine 102. The transmission 104 is a power management system which provides controlled application of the rotational power generated by the engine 102 by means of a gear box.

At least a portion of an end of the transmission output shaft 106, opposite the transmission 104, may be drivingly connected to an end of a first joint assembly 108. The universal joint assembly 108 is a joint or coupling assembly that allows rotational energy to be transferred between shafts having a variable axis. In a non-limiting example, the universal joint assembly 108 may be a universal coupling, a U-joint, a cardan joint, a double cardan joint, a Spicer joint, a Hardy Spicer Joint or a Hooke's joint.

Drivingly connected to an end of the first joint assembly 108, opposite the transmission output shaft 106, is an end of a first shaft 110. It is within the scope of this disclosure and as a non-limiting example that the first shaft 110 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the first shaft 110, opposite the first joint assembly 108, may be drivingly connected to a second joint assembly 114 of the vehicle 100. As a non-limiting example, the second joint assembly 114 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

As illustrated in FIG. 2 of the disclosure and as a non-limiting example, at least a portion of an end of the first shaft 110, opposite the first joint assembly 108, may be supported by one or more first center bearing assemblies 116 according to an embodiment of the disclosure. The one or more first center bearing assemblies 116 provide an amount of radial and axial support for at least a portion of the first shaft 110 of the drivetrain assembly 112, while at the same time providing rotational support for the first shaft 110 of the vehicle 100. It is therefore to be understood that the one or more first center bearing assemblies 116 aid in increasing the overall life and durability of the various components of the drivetrain assembly 112 of the vehicle 100.

Drivingly connected to an end of the second joint assembly 114, opposite the first shaft 110, is an end of a second shaft 118 of the drivetrain assembly 112 of the vehicle 100. It is within the scope of this disclosure and as a non-limiting example that the second shaft 118 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the second shaft 118, opposite the second joint assembly 114, may be drivingly connected to at least a portion of a third joint assembly 120. As a non-limiting example, the third joint assembly may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

At least a portion of an end of the third joint assembly 120 is drivingly connected to an end of a third shaft 122. It is within the scope of this disclosure and as a non-limiting example that the third shaft 122 may be a drive shaft, a propeller shaft or a prop shaft. An end of the third shaft 122, opposite the third joint assembly 120, may be drivingly connected to at least a portion of an inter-axle differential assembly 124 of a forward tandem axle system 126 of a rear tandem axle system 128 of the vehicle 100. The inter-axle differential assembly 124 is a device that divides the rotational power generated by the engine 102 between the axles in the vehicle 100.

In accordance with the embodiment illustrated in FIG. 2 of the disclosure and as a non-limiting example, at least a portion of an end of the second shaft 118, adjacent to the third joint assembly 120, may be supported by one or more second center bearing assemblies 121 according to an embodiment of the disclosure. The one or more second center bearing assemblies 121 provide an amount of radial and axial support for at least a portion of the second shaft 118 of the drivetrain assembly 112, while at the same time providing rotational support for the second shaft 118 of the vehicle 100. It is therefore to be understood that the one or more second center bearing assemblies 121 aid in increasing the overall life and durability of the various components of the drivetrain assembly 112 of the vehicle 100. As illustrated in FIG. 2 of the disclosure and as a non-limiting example, the inter-axle differential assembly 124 may be drivingly connected to a forward tandem axle differential assembly 130 and a forward tandem axle system output shaft 132. The forward tandem axle differential assembly 130 is a set of gears that allows the outer drive wheel(s) to rotate at a faster rate than the inner drive wheel(s) of the vehicle 100.

According to an embodiment of the disclosure and as a non-limiting example, at least a portion of the end of the third shaft 122, opposite the third joint assembly 120, may be drivingly connected to a fourth joint assembly 134 which in turn is drivingly connected to at least a portion of the inter-axle differential assembly 124 of the vehicle 100. As illustrated in FIG. 2 of the disclosure and as a non-limiting example, at least a portion of an end of a fourth shaft 136 may drivingly connected to at least a portion of an end of the fourth joint assembly 134, opposite the third shaft 122. Additionally, as illustrated in FIG. 2 of the disclosure and as a non-limiting example, at least a portion of an end of the fourth shaft 136, opposite the fourth joint assembly 134, may be drivingly connected to at least a portion of the inter-axle differential assembly 124 of the vehicle 100. It is within the scope of this disclosure and as a non-limiting example that the fourth shaft 136 may be an inter-axle differential input shaft, a differential input shaft, a forward tandem axle system input shaft, a pinion gear shaft or any other type of shaft that provides an amount of rotational power to the inter-axle differential assembly 124 and the forward tandem axle differential assembly 130 of the vehicle 100. Additionally, it is within the scope of this disclosure and as a non-limiting example that the fourth joint assembly 134 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

In accordance with the embodiment illustrated in FIG. 2 and as a non-limiting example, the forward tandem axle system 126 further includes a first forward tandem axle half shaft 138 and a second forward tandem axle half shaft 140. At least a portion of a first end portion 142 of the first forward tandem axle half shaft 138 may be drivingly connected to at least a portion of a first forward tandem axle wheel end assembly 144 and at least a portion of a second end portion 146 of the first forward tandem axle half shaft 138 may be drivingly connected to a side of the forward tandem axle differential assembly 130 of the vehicle 100.

Extending substantially perpendicular to the fourth shaft 136 is the second forward tandem axle half shaft 140 of the vehicle 100. At least a portion of a first end portion 148 of the second forward tandem axle half shaft 140 may be drivingly connected to at least a portion of a second forward tandem axle wheel end assembly 150. Additionally, at least a portion of a second end portion 152 of the second forward tandem axle half shaft 140 may be drivingly connected to an end of the forward tandem axle differential assembly 130, opposite the first forward tandem axle half shaft 138 of the vehicle 100.

At least a portion of an end of the forward tandem axle system output shaft 132 is drivingly connected to a side of the inter-axle differential assembly 124, opposite the fourth shaft 136. Drivingly connected to at least a portion of an end of the forward tandem axle system output shaft 132, opposite the inter-axle differential assembly 124, is a fifth joint assembly 154. It is within the scope of this disclosure and as a non-limiting example that the fifth joint assembly 154 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

At least a portion of an end of the fifth joint assembly 154, opposite forward tandem axle system output shaft 132, may be drivingly connected to at least a portion of an end of a fifth shaft 158 of the drivetrain assembly 112. It is within the scope of this disclosure and as a non-limiting example that the fifth shaft 158 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the fifth shaft 158, opposite the fifth joint assembly 154, may be drivingly connected to at least a portion of a rear tandem axle differential assembly 160 of a rear tandem axle system 162 of the rear tandem axle system 128 of the vehicle 100. The rear tandem axle differential assembly 160 is a set of gears that allows the outer drive wheel(s) to rotate at a faster rate than the inner drive wheel(s) of the vehicle 100.

In accordance with an embodiment of the disclosure and as a non-limiting example, at least a portion of the end of the fifth shaft 158, opposite the fifth joint assembly 154, may be drivingly connected to a sixth joint assembly 164 which in turn is drivingly connected to at least a portion of the rear tandem axle differential assembly 160 of the vehicle 100. As illustrated in FIG. 2 of the disclosure and as a non-limiting example, at least a portion of an end of a sixth shaft 166 may drivingly connected to at least a portion of an end of the sixth joint assembly 164, opposite the fifth shaft 158. Additionally, as illustrated in FIG. 2 and as a non-limiting example, at least a portion of an end of the sixth shaft 166, opposite the sixth joint assembly 166, may be drivingly connected to at least a portion of the rear tandem axle differential assembly 160 of the vehicle 100. It is within the scope of this disclosure and as a non-limiting example that the sixth shaft 166 may be a differential input shaft, a rear tandem axle system input shaft, a pinion gear shaft or any other type of shaft that provides an amount of rotational power to the rear tandem axle differential assembly 160 of the vehicle 100. Additionally, it is within the scope of this disclosure and as a non-limiting example that the sixth joint assembly 164 may be a universal joint assembly, a U-joint, assembly a cardan joint assembly, a double cardan joint assembly, a Spicer joint assembly, a Hardy Spicer Joint assembly, a Hooke's joint assembly, a constant velocity joint assembly, a CV joint, rubber joint or a homokinetic joint assembly.

The rear tandem axle system 162 of the vehicle 100 further includes a first rear tandem axle half shaft 168 and a second rear tandem axle half shaft 170. The first rear tandem axle half shaft 168 extends substantially perpendicular to the sixth shaft 166. At least a portion of a first end portion 172 of the first rear tandem axle half shaft 168 may be drivingly connected to at least a portion of a first rear tandem axle wheel end assembly 174 and at least a portion of a second end portion 176 of the first rear tandem axle half shaft 168 may be drivingly connected to a side of the rear tandem axle differential assembly 160.

Extending substantially perpendicular to the sixth shaft 166 is the second rear tandem axle half shaft 170 of the vehicle 100. At least a portion of a first end portion 178 of the second rear tandem axle half shaft 170 may be drivingly connected to at least a portion of a second rear tandem axle wheel end assembly 180. Additionally, at least a portion of a second end portion 182 of the second rear tandem axle half shaft 170 may be drivingly connected to an end of the rear tandem axle differential assembly 160, opposite the first rear tandem axle half shaft 168 of the vehicle 100.

In accordance with an embodiment of the disclosure and as a non-limiting example, the drivetrain assembly 112 may include one or more third center bearing assemblies (not shown) according to an embodiment of the disclosure. The one or more third center bearing assemblies (not shown) of the drivetrain assembly 112 of the vehicle 100 may be in direct contact with and provide support for an end of the second shaft 118, opposite the third joint assembly 120. The one or more third center bearing assemblies (not shown) provide an amount of radial and axial support for at least a portion of the second shaft 118 of the drivetrain assembly 112, while at the same time provide rotational support for the second shaft 118. It is within the scope of this disclosure and as a non-limiting example that the one or more third center bearing assemblies (not shown) may be used in combination with or in place of the one or more first center bearing assemblies 116 illustrated in FIG. 2 of the disclosure.

In accordance with a further embodiment of the disclosure and as a non-limiting example, the drivetrain assembly 112 may include one or more fourth center bearing assemblies (not shown) according to an embodiment of the disclosure. The one or more fourth center bearing assemblies (not shown) of the drivetrain assembly 112 of the vehicle 100 may be in direct contact with and provide support for an end of the third shaft 122, opposite the fourth joint assembly 134. The one or more fourth center bearing assemblies (not shown) provide an amount of radial and axial support for at least a portion of the third shaft 122 of the drivetrain assembly 112, while at the same time provide rotational support for the third shaft 122. It is within the scope of this disclosure and as a non-limiting example that the one or more fourth center bearing assemblies (not shown) may be used in combination with or in place of the one or more second center bearing assemblies 121 illustrated in FIG. 2 of the disclosure.

Figure 3:
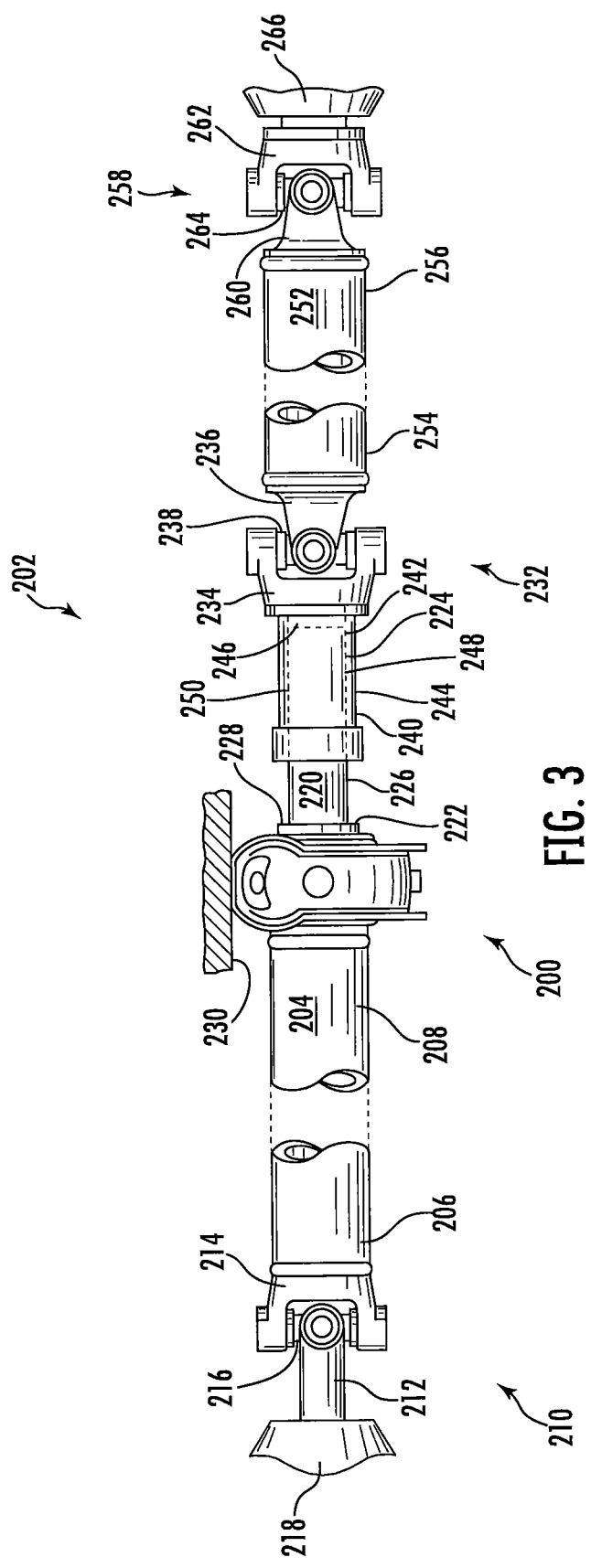
FIG. 3 is a partial cut-away schematic side-view of a portion of a drive-line assembly having one or more center bearing assemblies according to an embodiment of the disclosure.
Figure 3A:
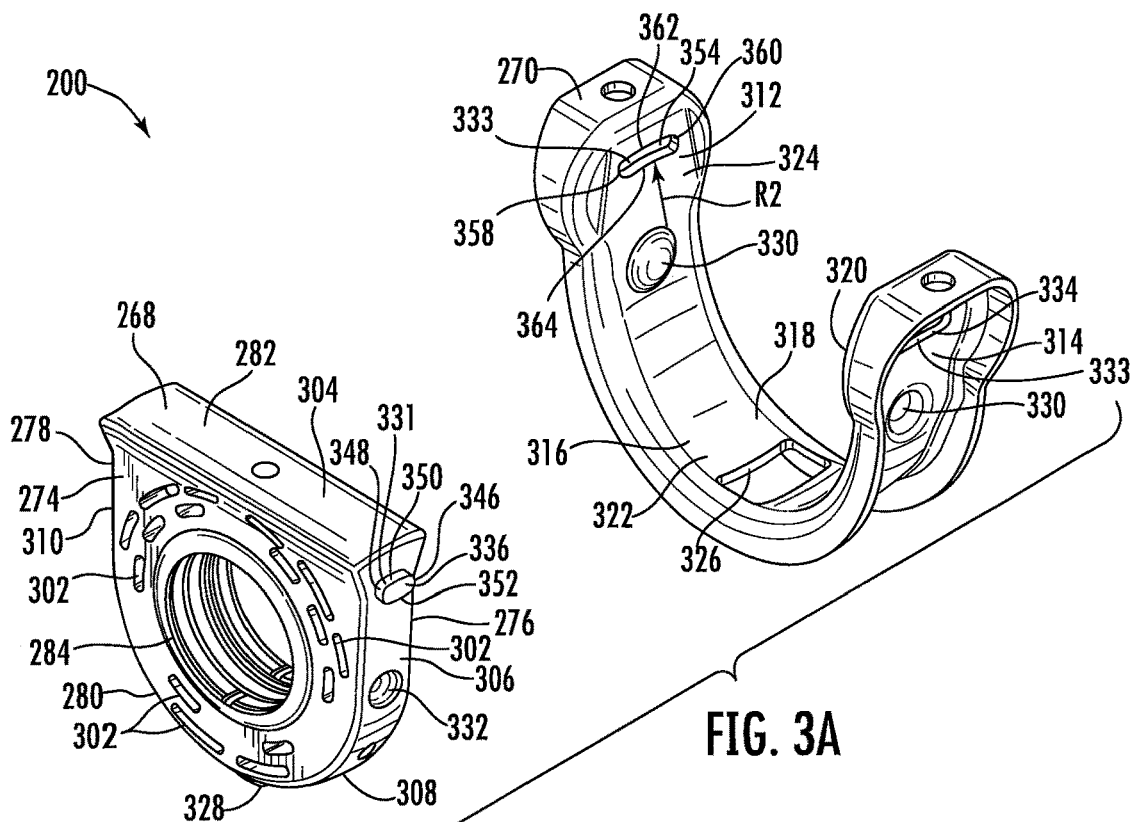
FIG. 3A is a schematic exploded-view of the one or more center bearing assemblies illustrated in FIG. 3 according to an embodiment of the disclosure.
Figure 3B:
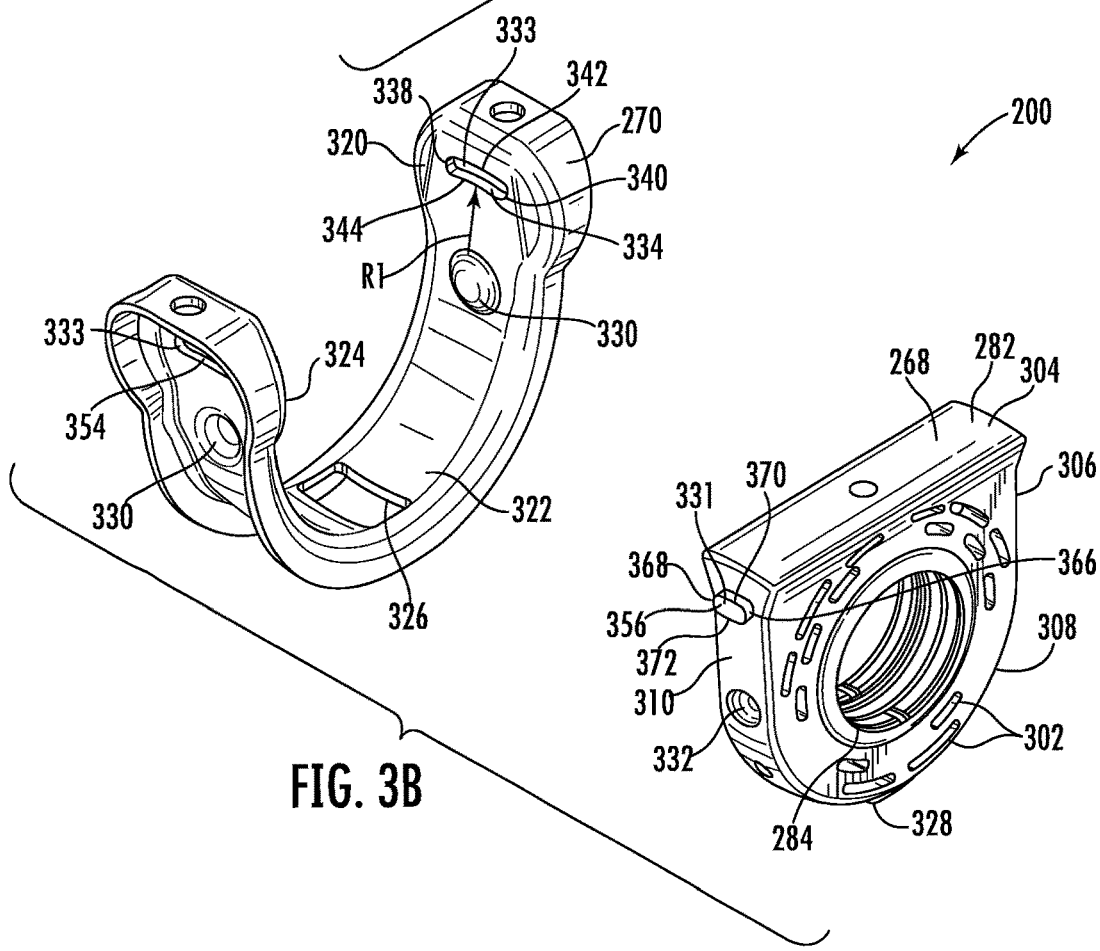
FIG. 3B is a schematic exploded-view of the one or more center bearing assemblies illustrated in FIGS. 3 and 3A according to an embodiment of the disclosure.
Figure 3C:
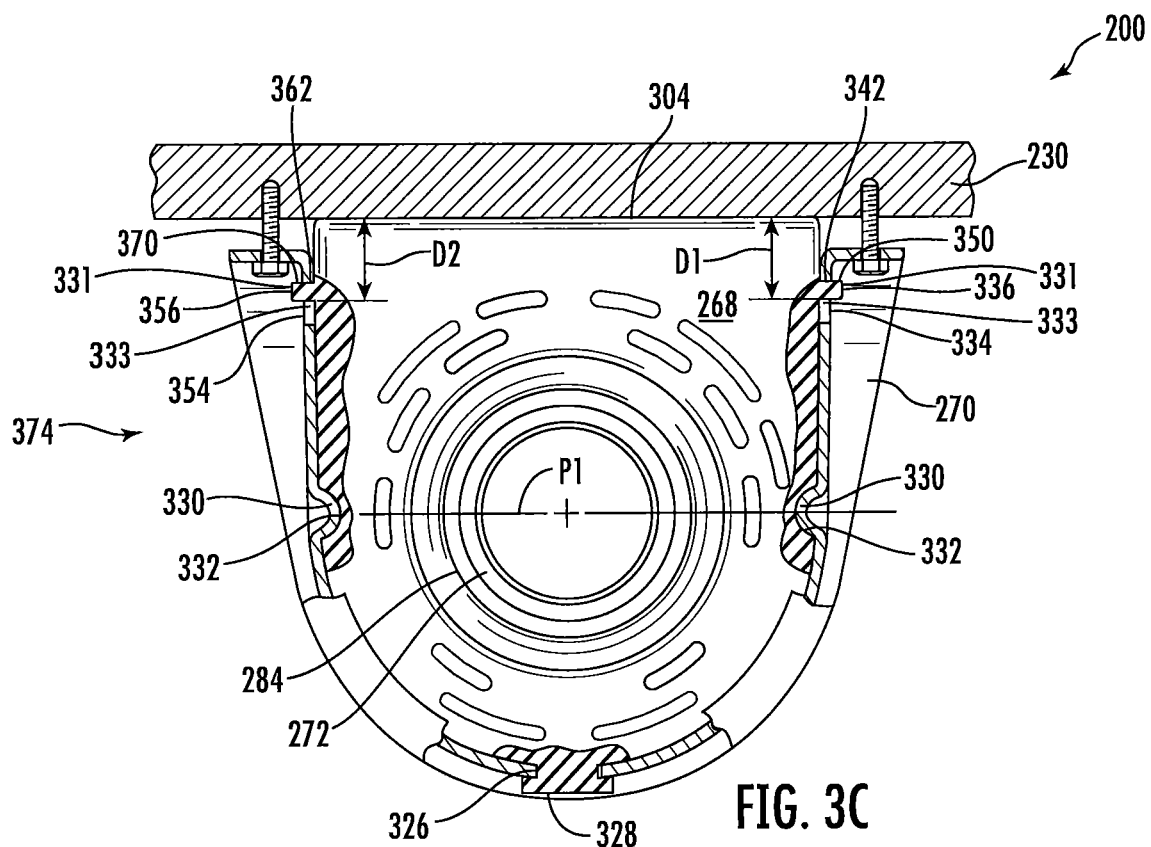
FIG. 3C is a partial cut-away schematic front-view of the one or more center bearing assemblies illustrated in FIGS. 3-3B, when the one or more center bearing assemblies are in a partially installed position.
Figure 3D:
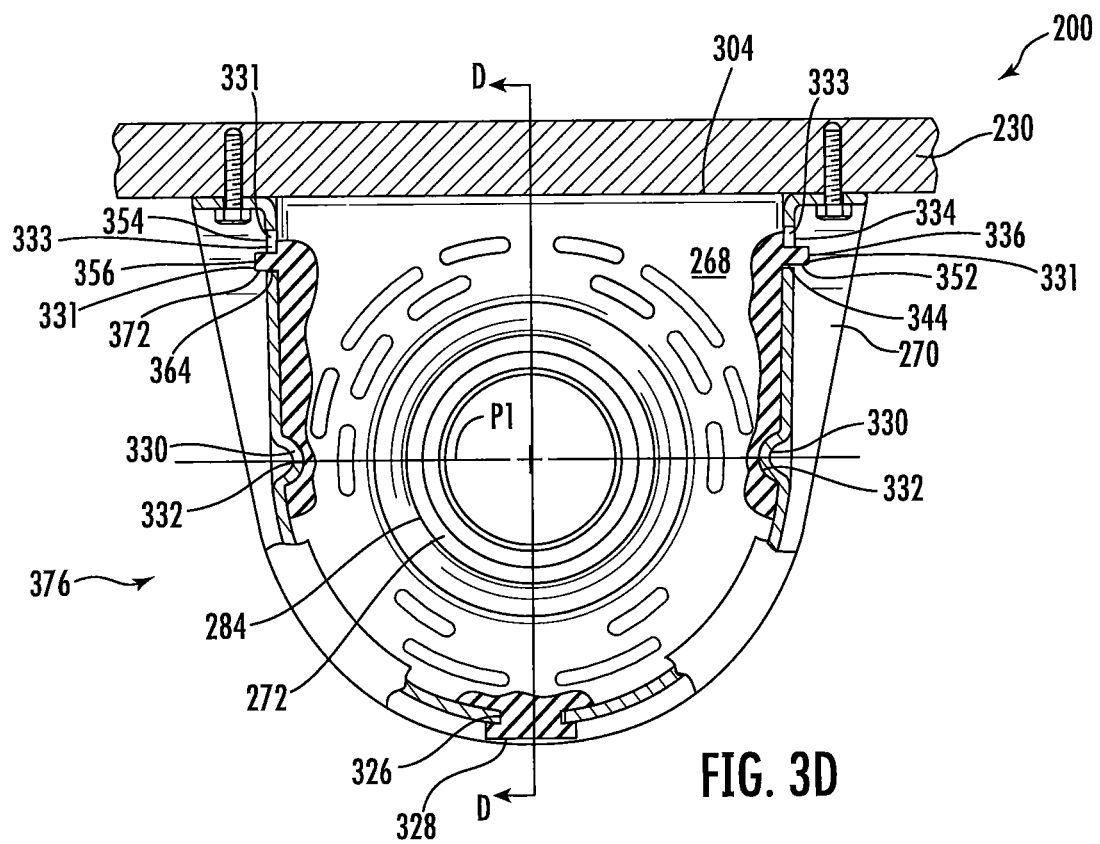
FIG. 3D is a partial cut-away schematic front-view of the one or more center bearing assemblies illustrated in FIGS. 3-3C, when the one or more center bearing assemblies are in a fully assembled position.
Figure 3E:
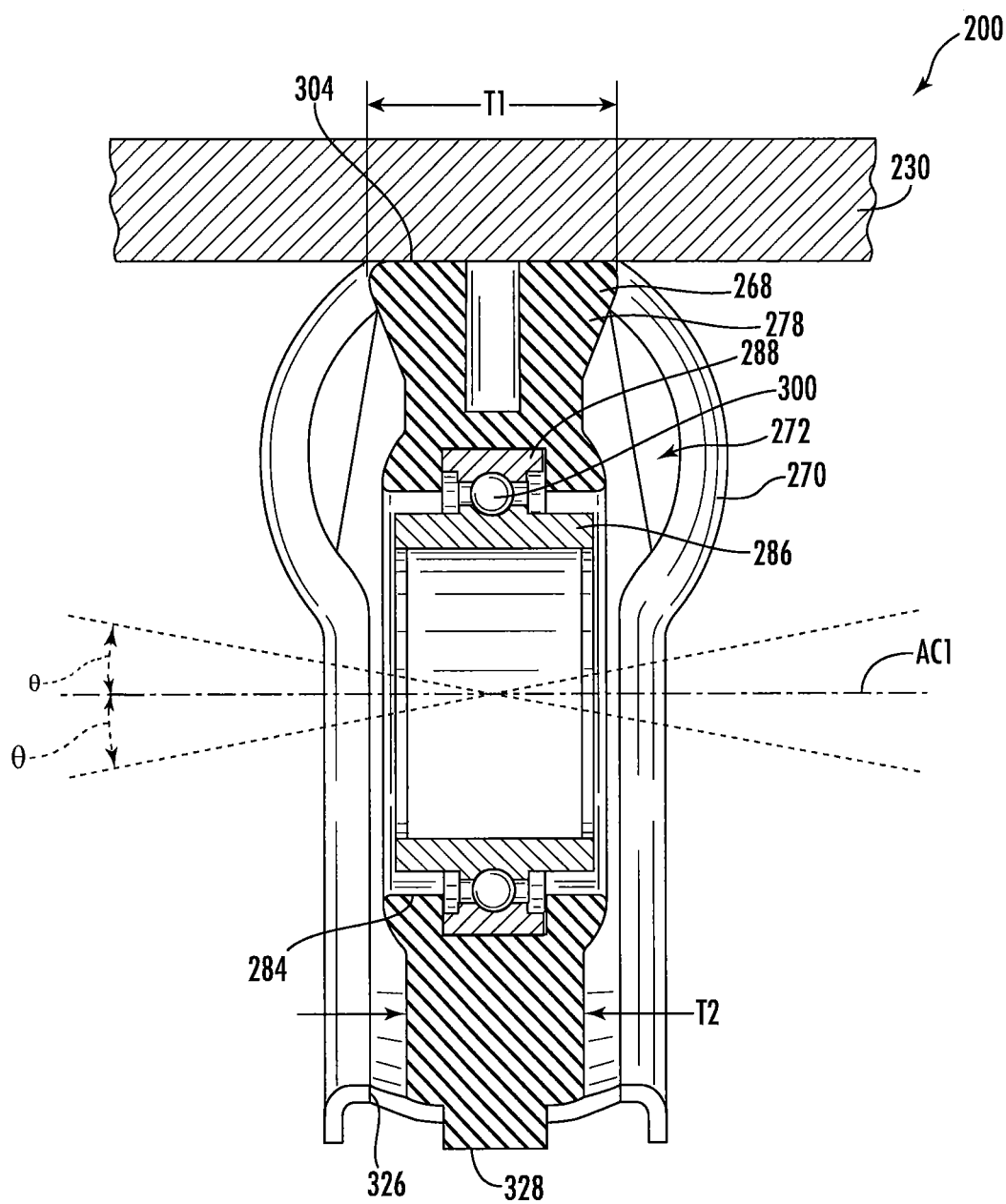
FIG. 3E is a partial cut-away schematic side-view of the one or more center bearing assemblies illustrated in FIGS. 3-3D along the line D-D according to an embodiment of the disclosure.

FIGS. 3-3E provide a schematic illustration of one or more center bearing assemblies 200 according to an embodiment of the disclosure. As best seen in FIG. 3 of the disclosure and as a non-limiting example, the one or more center bearing assemblies 200 may be part of a drivetrain assembly 202 with a first joint assembly 210 having a first joint member 212 that is drivingly connected to a second joint member 214 by using one or more third joint members 216. The first joint assembly 210 of the drivetrain assembly 202 allows for the transfer of an amount of rotational power from one component of the drivetrain assembly 202 to another having a different or a variable axis of rotation. It is within the scope of this disclosure and as a non-limiting example that the first joint member 212 may be a first yoke member, the second joint member 214 may be a second yoke member and the one or more third joint members 216 may be a journal cross. As a result, it is within the scope of this disclosure and as a non-limiting example that the first joint assembly 210 may be a universal joint assembly, a U-joint, assembly a cardan joint assembly, a double cardan joint assembly, a Spicer joint assembly, a Hardy Spicer Joint assembly, rubber joint or a Hooke's joint assembly.

At least a portion of a first drivetrain component 218 may be drivingly connected to at least a portion of the first joint member 212 of the first joint assembly 210. It is within the scope of this disclosure and as a non-limiting example that the first drivetrain component 218 of the drivetrain assembly 202 may be a transmission assembly, a differential assembly, a motor, a forward tandem axle differential assembly or an inter-axle differential assembly.

Drivingly connected to at least a portion of the second joint member 214 of the first joint assembly 210 is a first shaft 204 having a first end portion 206 and a second end portion 208. At least a portion of the first end portion 206 of the first shaft 204 may be drivingly connected to at least a portion of the second joint member 214 of the first joint assembly 210 by using one or more welds, one or more mechanical fasteners, one or more adhesives and/or a spline connection. As a result, it is therefore to be understood that the first end portion 206 of the first shaft 204 may be connected to at least a portion of the second joint member 214 by using a slip yoke type connection (not shown) where the first shaft 204 is able to move axially relative to the second joint member 214 while still remaining drivingly connected to each other. It is within the scope of this disclosure and as a non-limiting example, the first shaft 204 may be a propeller shaft, a drive shaft, a cardan shaft, a double cardan shaft, a universal joint shaft, a Hooke's joint shaft or any other shaft in the drivetrain assembly 202 that is used to transmit the rotational energy from one component to another.

At least a portion a second shaft 220 is drivingly connected to at least a portion of the second end portion 208 of the first shaft 204 of the drivetrain assembly 202. As best seen in FIG. 3 of the disclosure and as a non-limiting example, the second shaft 220 has a first end portion 222, a second end portion 224 and an outer surface 226. Circumferentially extending from at least a portion of the outer surface 226 of the first end portion 222 of the second shaft 220 is an increased diameter portion 228. At least a portion of the increased diameter portion 228 of the first end portion 222 of the second shaft 220 may be drivingly connected to at least a portion of the second end portion 208 of the first shaft 204. It is within the scope of this disclosure and as a non-limiting example that the increased diameter portion 228 of the second shaft 220 may be drivingly connected to the first shaft 204 by using one or more welds, one or more mechanical fasteners, one or more adhesives and/or a spline connection.

In accordance with the embodiment illustrated in FIG. 3 and as a non-limiting example, at least a portion of the one or more center bearing assemblies 200 may be in direct contact with and disposed directly radially outboard from at least a portion of the increased diameter portion 228 of the drivetrain assembly 202. Additionally, as illustrated in FIG. 3 of the disclosure and as a non-limiting example, at least a portion of the one or more center bearing assemblies 200 may be connected to at least a portion of a support surface 230. It is within the scope of this disclosure and as a non-limiting example that the support surface 230 may be a portion of a chassis of the vehicle (not shown).

Drivingly connected to at least a portion of the second end portion 224 of the second shaft 220 is at least a portion of a second joint assembly 232. As best seen in FIG. 3 of the disclosure and as a non-limiting example, the second joint assembly 232 of the drivetrain assembly 202 has a first joint member 234 that is drivingly connected to at least a portion of a second joint member 236 by using one or more third joint members 238. The second joint assembly 232 of the drivetrain assembly 202 allows for the transfer of an amount of rotational power from one component of the drivetrain assembly 202 to another having a different or a variable axis of rotation. It is within the scope of this disclosure and as a non-limiting example that the first joint member 234 may be a first yoke member, the second joint member 236 may be a second yoke member and the one or more third joint members 238 may be a journal cross. As a result, it is within the scope of this disclosure and as a non-limiting example that the second joint assembly 232 may be a universal joint assembly, a U-joint, assembly a cardan joint assembly, a double cardan joint assembly, a Spicer joint assembly, a Hardy Spicer Joint assembly, rubber joint or a Hooke's joint assembly.

According to the embodiment illustrated in FIG. 3 of the disclosure and as a non-limiting example, the first joint member 234 of the second joint assembly 232 may include a shaft portion 240 having an inner surface 242 and an outer surface 244 defining a hollow portion 246 therein. Circumferentially extending along at least a portion of the inner surface 242 of the shaft portion 240 of the first joint member 234 of the second joint assembly 232 is a plurality of axially extending first joint member splines 248. The plurality of axially extending first joint member splines 248 are complementary to and meshingly engaged with at least a portion of a plurality of axially extending second shaft splines 250 circumferentially extending along at least a portion of the outer surface 226 of the second end portion 224 of the second shaft 220.

At least a portion of a first end portion 254 of a third shaft 252 of the drivetrain assembly 202 may be drivingly connected to at least a portion of the second joint member 236 of the second joint assembly 232. It is within the scope of this disclosure and as a non-limiting example that the third shaft 252 may be drivingly connected to second joint member 236 of the second joint assembly 232 by using one or more welds, one or more mechanical fasteners, one or more adhesives and/or a spline connection. As a result, it is therefore to be understood that the first end portion 254 of the third shaft 252 may be connected to at least a portion of the second joint member 236 by using a slip yoke type connection (not shown) where the third shaft 252 is able to move axially relative to the second joint member 236 while still remaining drivingly connected to each other. It is within the scope of this disclosure and as a non-limiting example, that the third shaft 252 may be a propeller shaft, a drive shaft, a cardan shaft, a double cardan shaft, a universal joint shaft, a Hooke's joint shaft or any other shaft in the drivetrain assembly 202 that is used to transmit an amount of rotational energy from one component to another.

As best seen in FIG. 3 and as a non-limiting example, at least a portion of a third joint assembly 258 may be drivingly connected to at least a portion of the second end portion 256 of the third shaft 252. The third joint assembly 258 may include a first joint member 260 that is drivingly connected to a second joint member 262 by using one or more third joint members 264. The third joint assembly 258 of the drivetrain assembly 202 allows for the transfer of an amount of rotational power from one component of the drivetrain assembly 202 to another having a different or a variable axis of rotation. It is within the scope of this disclosure and as a non-limiting example that the first joint member 260 may be a first yoke member, the second joint member 262 may be a second yoke member and the one or more third joint members 264 may be a journal cross. As a result, it is within the scope of this disclosure and as a non-limiting example that the third joint assembly 258 may be a universal joint assembly, a U-joint, assembly a cardan joint assembly, a double cardan joint assembly, a Spicer joint assembly, a Hardy Spicer Joint assembly, rubber joint or a Hooke's joint assembly.

In accordance with the embodiment illustrated in FIG. 3 and as a non-limiting example, at least a portion of the first joint member 260 may be drivingly connected to at least a portion of the second end portion 256 of the third shaft 252. It is within the scope of this disclosure and as a non-limiting example that the first joint member 260 may be drivingly connected to at least a portion of the second end portion 256 of the third shaft 252 by using one or more welds, one or more mechanical fasteners, one or more adhesives and/or a spline connection. As a result, it is therefore to be understood that the second end portion 256 of the third shaft 252 may be connected to at least a portion of the first joint member 260 by using a slip yoke type connection (not shown) where the third shaft 252 is able to move axially relative to the first joint member 260 while still remaining drivingly connected to each other.

Drivingly connected to at least a portion of the second joint member 262 of the third joint assembly 258 is a second drivetrain component 266 of the drivetrain assembly 202 of the vehicle (not shown). It is within the scope of this disclosure and as a non-limiting example that the second drivetrain component 266 of the drivetrain assembly 202 may be a rear differential assembly, a rear tandem axle differential assembly, a forward tandem axle differential assembly or an inter-axle differential assembly.

As best seen in FIGS. 3A-3E of the disclosure and as a non-limiting example, the one or more center bearing assemblies 200 may include a cushion portion 268, a bracket portion 270 and a bearing assembly 272. In accordance with the embodiment illustrated in FIG. 3A of the disclosure and as a non-limiting example, the cushion portion 268 of the one or more center bearing assemblies 200 have a first side 274, a second side 276, a top surface 278, a bottom surface 280 and an outer peripheral surface 282. The cushion portion 268 of the one or more center bearing assemblies 200 provides support for at least a portion of the bearing assembly 272, the first shaft 204, the second shaft 220, the second joint assembly 232 and/or the third shaft 252 of the drivetrain assembly 202. Additionally, the cushion portion 268 aids in reducing the overall amount of NVH experienced by the drivetrain assembly 202. It is within the scope of this disclosure and as a non-limiting example that the cushion portion 268 of the one or more center bearing assemblies 200 may be made of a resilient material such as but not limited to an elastomeric material, a rubber material, a polymeric material and/or a composite composition.

Extending from the first side 274 to the second side 276 of the cushion portion 268 of the one or more center bearing assemblies 200 is an axially extending bearing aperture 284. The axially extending bearing aperture 284 may be of a size and shape to receive and/or retain at least a portion of the bearing assembly 272 of the one or more center bearing assemblies 200. It is within the scope of this disclosure and as a non-limiting example that the one or more bearing assemblies 272 may be one or more roller bearing assemblies, one or more needle bearing assemblies, one or more tapered roller bearing assemblies, one or more magnetic bearing assemblies and/or one or more angular contact ball bearing assemblies.

According to the embodiment illustrated in FIG. 3E of the disclosure and as a non-limiting example, the one or more bearing assemblies 272 may include an inner race 286, an outer race 288 and one or more rolling elements 300 interposed between the inner race 286 and the outer race 288. At least a portion of the inner race 286 of the one or more bearing assemblies 272 may be in direct contact with at least a portion of the first shaft 204, the second shaft 220 and/or the second joint assembly 232 of the drivetrain assembly 202. In accordance with an embodiment of the disclosure and as a non-limiting example, at least a portion of the inner race 286 of the one or more bearing assemblies 272 may be in direct contact with at least a portion of the second end portion 208 of the first shaft 204, the first end portion 222 of the second shaft 220, the second joint assembly 232 and/or the shaft portion 240 of the first joint member 234 of the second joint assembly 232.

At least a portion of the outer race 288 and/or the inner race 286 of the one or more bearing assemblies 272 may be integrally connected to and/or integrally formed with at least a portion of the cushion portion 268 of the one or more center bearing assemblies 200. It is within the scope of this disclosure and as a non-limiting example that at least a portion of the inner race 286 and/or the outer race 288 of the one or more bearing assemblies 272 may be integrally connected to and/or integrally formed as part of the cushion portion 268 by using one or more welds, one or more adhesives and/or one or more vulcanization processes.

Extending from at least a portion of the first side 274 to the second side 276 of the cushion portion 268 of the one or more center bearing assemblies 200 is one or more slots 302. The one or more slots 302 aid in providing an amount of additional flexibility and NVH reduction capability to the cushion portion 268 of the one or more center bearing assemblies 200. As best seen in FIG. 3A of the disclosure and as a non-limiting example, the one or more slots 302 may be disposed radially around the axially extending bearing aperture 284 in the cushion portion 268 of the center bearing assembly 200. It is within the scope of this disclosure and as a non-limiting example that the one or more slots 302 in the cushion portion 268 may be substantially cylindrical and/or substantially arcuate in shape.

As best seen in FIG. 3A of the disclosure and as a non-limiting example, the outer peripheral surface 282 of the cushion portion 268 of the one or more center bearing assemblies 200 may include in order a first surface 304, a second surface 306, a third surface 308 and a fourth surface 310. It is within the scope of this disclosure and as a non-limiting example that the second and fourth surfaces 306 and 310 of the cushion portion 268 may be substantially straight and extend substantially parallel to each other on opposing sides of the cushion portion 268. Additionally, it is within the scope of this disclosure and as a non-limiting example that the third surface 308 of the cushion portion 268 may be substantially arcuate in shape and may be connected to an end of the second and fourth surfaces 306 and 310, opposite the first surface 304 of the cushion portion 268. Furthermore, it is within the scope of this disclosure and as a non-limiting example that the first surface 304 may extend substantially perpendicular to the second and fourth surfaces 306 and 310 of the cushion portion 268 and may be connected to an end of the second and fourth surfaces 306 and 310, opposite the third surface 308. As a result, it is within the scope of this disclosure and as a non-limiting example that the first surface 304 of the cushion portion 268 may extend in a substantially horizontal manner and/or parallel to a plane P1 extending relative to an axial centerline AC1 of the one or more bearing assemblies 272.

In accordance with the embodiment illustrated in FIG. 3E and as a non-limiting example, the top surface 278 and/or the first surface 304 of the cushion portion 268 of the center bearing assembly 200 may have a thickness T1 and the body portion of the cushion portion 268 may have a thickness T2. It is within the scope of this disclosure and as a non-limiting example that the thickness T1 may be greater than the thickness T2 of the body portion of the of the cushion portion 268. By providing the top surface 278 and/or the first surface 304 of the cushion portion 268 with an increased thickness, it provides an increased amount of surface area contact between the cushion portion 268 and the support surface 230 of the drivetrain assembly 202. This aids in ensuring a secure connection between the cushion portion 268 and the support surface 230 and increases the overall amount of force needed to rotate the cushion portion 268 once the center bearing assembly 200 has been assembled within the drivetrain assembly 202 of the vehicle (not shown).

According to the embodiment illustrated in FIG. 3A and as a non-limiting example, the first surface 304 of the cushion portion 268 of the center bearing assembly 200 may have a substantially arcuate and/or a substantially convex cross-sectional shape. Once the center bearing assembly 200 has been assembled within the drivetrain assembly 202, the first surface 304 may be elastically deformed inward until it becomes substantially flat as shown in FIG. 3E of the disclosure. This aids in increasing the overall amount of force between the cushion portion 268, the bracket portion 270 and/or the support surface 230 making it harder to rotate the cushion portion 268 once installed within the drivetrain 202 of the vehicle (not shown).

As best seen in FIG. 3A of the disclosure and as a non-limiting example, the bracket portion 270 has an inner surface 312, an outer surface 314, a first end portion 316 and a second end portion 318. The inner surface 312 of the bracket portion 270 may have shape that is substantially complementary to the outer peripheral surface 282 of the cushion portion 268 of the center bearing assembly 200. It is therefore within the scope of this disclosure and as a non-limiting example that the inner surface 312 of the bracket portion 270 may include a first surface 320 that is substantially flat in shape, a second surface 322 that is substantially arcuate in shape and a third surface 324 that is substantially flat in shape and extends substantially parallel to the first surface 320. At least a portion of an end of the first and third surfaces 320 and 324 of the inner surface 312 of the bracket portion 270 may be connected to and extend outward from opposing ends of the second surface 322 of the bracket portion 270. It is within the scope of this disclosure and as a non-limiting example that the first surface 320 may be complementary to the second surface 306 of the cushion portion 268, the second surface 322 may be complementary to the third surface 308 of the cushion portion 268 and the third surface 324 may be complementary to the fourth surface 310 of the cushion portion 268 of the center bearing assembly 200.

Extending from the inner surface 312 to the outer surface 314 of the second surface 322 of the bracket portion 270 is a first aperture 326. The first aperture 326 in the bracket portion 270 of the center bearing assembly 200 may be of a size and shape to receive and/or retain at least a portion of a protruding portion 328 extending from at least a portion of the third surface 308 of the outer peripheral surface 282 of the cushion portion 268. This aids in preventing the cushion portion 268 from rotating beyond a pre-determined amount during assembly of the drivetrain assembly 202.

The bracket portion 270 of the center bearing assembly 200 may include one or more protruding portions 330. It is within the scope of this disclosure and as a non-limiting example that the one or more protruding portions 330 may extend outward from at least a portion of the first, second and/or third surfaces 320, 322 and/or 324 of the inner surface 312 of the bracket portion 270. The one or more protruding portions 330 may have a size and shape that is complementary to one or more recessed portions 332 extending inward into the outer peripheral surface 282 of the cushion portion 268 of the center bearing assembly 200. Once the one or more protruding portions 330 of the bracket portion 270 are received within the one or more recessed portions 332 in the cushion portion 268, the one or more bearing assemblies 272 and the cushion portion 268 are allowed to pivot or rotate and angle θ relative to the bracket portion 270 about the axial centerline AC1 while the drivetrain assembly 202 of the vehicle (not shown) is being assembled. By providing a center bearing assembly 200 that is articulable, is able to pivot and/or is able to rotate, it aids in making the assembly of the various components of the drivetrain assembly 202 easier.

As best seen in FIGS. 3A, 3B, 3C, and 3D of the disclosure and as a non-limiting example, the center bearing assembly 200 may include one or more first retention portions 331 and one or more second retention portions 333. The one or more first and second retention portions 331 and 333 of the center bearing assembly 200 may be used in order to retain at least a portion of the cushion portion 268 relative to the bracket portion 270. According to the embodiment illustrated in FIG. 3C of the disclosure and as a non-limiting example, when the center bearing assembly 200 is in a first position 374, the cushion portion 268 may be selectively rotatable or movable relative to the bracket portion 270 of the center bearing assembly 200. Additionally, in accordance with the embodiment illustrated in FIG. 3D and as a non-limiting example, when the center bearing assembly 200 is in a second position 376, at least a portion of the one or more first retention portions 331 of the cushion portion 268 are engaged with at least a portion of the one or more second retention portions 333 of the bracket portion 270 of the center bearing assembly 200. It is within the scope of this disclosure and as a non-limiting example that the first position 374 may be a partially installed position on the vehicle (not shown) and the second position 376 may be a fully installed position on the vehicle (not shown). The interaction and/or engagement between the one or more first and second retention members 331 and 333 of the center bearing assembly 200, aids in preventing the cushion portion 268 from rotating relative to the bracket portion 270. As a result, this aids in reducing and/or eliminating the overall amount of movement experienced by the cushion portion 268 once in the second fully installed position 376 which in turn reduces and/or eliminates the overall amount of NVH in driveline and provides the vehicle (not shown) with superior ride characteristics.

It is within the scope of this disclosure and as a non-limiting example that the one or more first retention portions 331 of the cushion portion 268 may be one or more extending portions 336 and/or 356 as described and illustrated in relation to FIGS. 3-3E of the disclosure. Additionally, it is within the scope of this disclosure and as a non-limiting example that the one or more second retention portions 333 of the bracket portion 270 may be one or more receiving portions 334 and/or 354 as described and illustrated in relation to FIGS. 3-3E of the disclosure.

One or more first receiving portions 334 may extend from at least a portion of the first surface 320 to the outer surface 314 of the bracket portion 270 of the center bearing assembly 200. The one or more first receiving portions 334 in the bracket portion 270 may be of a size and shape to receive and/or retain at least a portion of one or more first extending portions 336 extending outward from at least a portion of the second surface 306 of the outer peripheral surface 282 of the cushion portion 268 of the center bearing assembly 200. It is within the scope of this disclosure and as a non-limiting example that the one or more first receiving portions 334 may have a substantially square shape, a substantially rectangular shape and/or a substantially arcuate shape. Additionally, it is within the scope of this disclosure and as a non-limiting example that the one or more first extending portions 336 may have a substantially obround shape, a substantially quonset shape, a substantially cube shape and/or a substantially cuboid shape. It is therefore to be understood that the one or more first receiving portions 334 may extend along a radius R1 relative to the plane P1. As a non-limiting example the plane P1 may extend substantially perpendicular to the first and third surfaces 320 and 324 of the bracket portion 270 and/or may extend through the axial centerline AC1 of the one or more bearing assemblies 272 of the center bearing assembly 200.

As best seen in FIG. 3B of the disclosure and as a non-limiting example, the one or more first receiving portions 334 may have a first end 338, a second end 340, a top surface 342 and a bottom surface 344. Additionally, as best seen in FIG. 3A of the disclosure and as a non-limiting example, the one or more first extending portions 336 may have a first end 346, a second end 348, a top surface 350 and a bottom surface 352. During assembly of the various components of the drivetrain assembly 202, the cushion portion 268 of the center bearing assembly 200 is prevented from pivoting or rotating beyond a pre-determined amount based on the size of the one or more first receiving portions 334 in the bracket portion 270. When at least a portion of the first end 346 of the one or more first extending portions 336 may be in direct contact with at least a portion of the first end 338 of the one or more first receiving portions 334 in the bracket portion 270, the cushion portion 268 is at a first maximum articulation portion (not shown). Additionally, when at least a portion of the second end 348 of the one or more first extending portions 336 are in direct contact with at least a portion of the second end 340 of the one or more first receiving portions 334 of the bracket portion 270, the cushion portion 268 is at a second maximum articulation position (not shown). This aids in preventing the over articulation, rotation and/or pivoting of the center bearing assembly 200 during assembly of the various components of the drivetrain assembly 202.

Extending from at least a portion of the third surface 324 to the outer surface 314 of the bracket portion 270 is one or more second receiving portions 354. The one or more second receiving portions 354 in the bracket portion 270 may be of a size and shape to receive and/or retain at least a portion of one or more second extending portions 356 extending outward from at least a portion of the fourth surface 310 of the cushion portion 268 of the center bearing assembly 200. It is within the scope of this disclosure and as a non-limiting example that the one or more second extending portions 356 may have a substantially obround shape, a substantially quonset shape, a substantially cube shape and/or a substantially cuboid shape. Additionally, it is within the scope of this disclosure and as a non-limiting example that the one or more second receiving portions 354 may have a substantially square shape, a substantially rectangular shape and/or a substantially arcuate shape. It is therefore to be understood that the one or more second receiving portions 354 may extend along a radius R2 relative to the plane P1 of the center bearing assembly 200.

As best seen in FIG. 3A of the disclosure and as a non-limiting example, the one or more second receiving portions 354 may have a first end 358, a second end 360, a top surface 362 and a bottom surface 364. Additionally, as best seen in FIG. 3B of the disclosure and as a non-limiting example, the one or more second extending portions 356 may have a first end 366, a second end 368, a top surface 370 and a bottom surface 372. During assembly of the various components of the drivetrain assembly 202 of the vehicle (not shown), the cushion portion 268 of the center bearing assembly 200 is prevented from pivoting or rotating a pre-determined amount based on the size of the one or more second receiving portions 354 in the bracket portion 270. When at least a portion of the first end 366 of the one or more second extending portions 356 are in direct contact with at least a portion of the first end 358 of the one or more second receiving portions 354 in the bracket portion 270, the cushion portion 268 is at a first maximum articulation portion (not shown). Additionally, when at least a portion of the second end 360 of the one or more second extending portions 356 are in direct contact with at least a portion of the second end 368 of the one or more second receiving portions 354 in the bracket portion 270, the cushion portion 268 is at a second maximum articulation position (not shown). This aids in preventing the over articulation, rotation and/or pivoting of the center bearing assembly 200 during assembly of the various components of the drivetrain assembly 202.

In accordance with the embodiment illustrated in FIG. 3C of the disclosure and as a non-limiting example, when the center bearing assembly 200 is in a partially installed portion 374, the cushion portion 268 and the one or more bearing assemblies 272 are able to freely articulate, pivot and/or rotate relative to the bracket portion 270. Additionally, when the center bearing assembly 200 is in the partially installed portion 374 illustrated in FIG. 3C, no part of the one or more first and/or second extending portions 336 and/or 356 of the cushion portion 268 are in direct contact with the bottom surfaces 344 and 364 of the one or more first and/or second receiving portions 334 and/or 354 in the bracket portion 270. It is within the scope of this disclosure and as a non-limiting example that when the center bearing assembly 200 is in the partially installed position 374, at least a portion of the top surfaces 350 and 370 of the one or more first and/or second extending members 336 and/or 356 may be in direct contact with or disposed proximate to at least a portion of the top surfaces 342 and 362 of the one or more first and/or second receiving portions 334 and/or 354 in the bracket portion 270.

When the center bearing assembly 200 is in the position illustrated in FIG. 3D, the center bearing assembly 200 may be in a fully installed position 376. As the cushion portion 268 transitions between the partially installed position 374 and the fully installed position 376 illustrated in FIGS. 3C and 3D, the cushion portion 268 is compressed inward toward the bracket portion 270 of the center bearing assembly 200. In accordance with the embodiment illustrated in FIG. 3D and as a non-limiting example, when the cushion portion 268 is in the fully installed position 376, at least a portion of the bottom surfaces 352 and/or 372 of the one or more first and/or second extending members 336 and/or 356 are in direct contact with at least a portion of the bottom surfaces 344 and 364 of the one or more first and/or second receiving portions 334 and/or 354 in the bracket portion 270. The physical interaction of the one or more first and/or second extending members 336 and/or 356 and the one or more first and/or second receiving portions 334 and/or 354 aids in increasing the overall amount of force between the cushion portion 268, the bracket portion 270 and/or the support surface 230. This aids in ensuring that the cushion portion 268 experiences little to no articulating, pivoting and/or rotating once in the fully installed position 376 during all operating conditions.

According to the embodiment illustrated in FIG. 3C and as a non-limiting example, when the center bearing assembly 200 is in the partially installed position 374, at least a portion of the first surface 304 of the outer peripheral surface 282 of the cushion portion 268 may be in direct contact with at least a portion of the support surface 230. When in this position, little to no force may be applied onto the cushion portion 268 of the center bearing assembly 200. This allows the one or more bearing assemblies 272 and/or the cushion portion 268 to freely articulate, pivot and/or rotate, thereby making the assembly and/or removal of the various components of the drivetrain assembly 202 easier. Additionally, when in the partially installed position 374, the bottom surfaces 352 and 372 of the one or more first and/or second extending members 336 and/or 356 may be disposed a distance D1 and D2 from the first surface 304 of the cushion portion 268 respectively. It is within the scope of this disclosure and as a non-limiting example that the distances D1 and D2 may be determined based on the operating temperatures of the center bearing assembly 200, the physical properties, the mechanical properties, the expansion properties, the contraction properties and/or the compressive properties of the material of the cushion portion 268. An accurate determination of the distances D1 and D2 is critical to the overall life, durability, operability and functionality of the center bearing assembly 200 within the drivetrain assembly 202. This aids in ensuring that the one or more first and/or second extending members 336 and/or 356 of the cushion portion 268 remain in direct contact with the one or more first and/or second receiving portions 334 and/or 354 of the bracket portion 270 at all times and during all operating conditions for the vehicle (not shown). It is therefore to be understood that this aids in ensuring that the cushion portion 268 experiences little to no articulation, pivoting and/or rotating once in the fully installed position 376, thereby providing a more robust and durable center bearing assembly 200.

Figure 4:
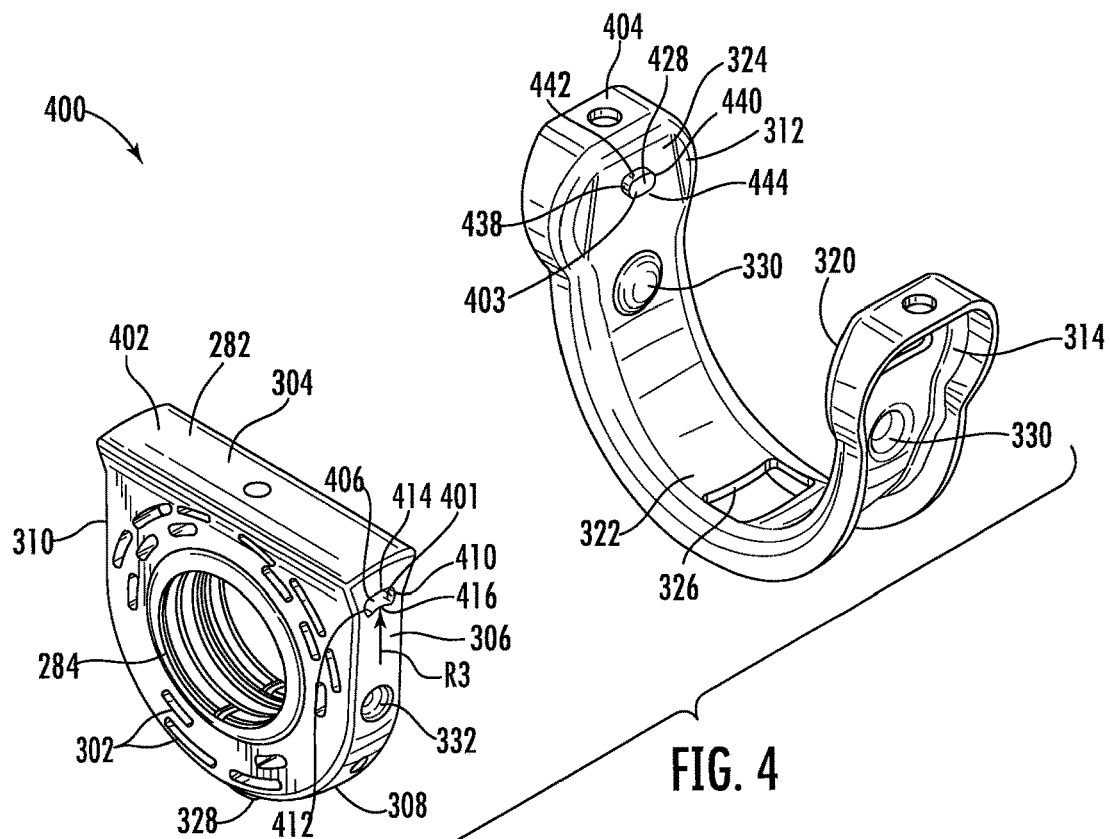
FIG. 4 is a schematic exploded-view of one or more center bearing assemblies according to an alternative embodiment of the disclosure.
Figure 4A:
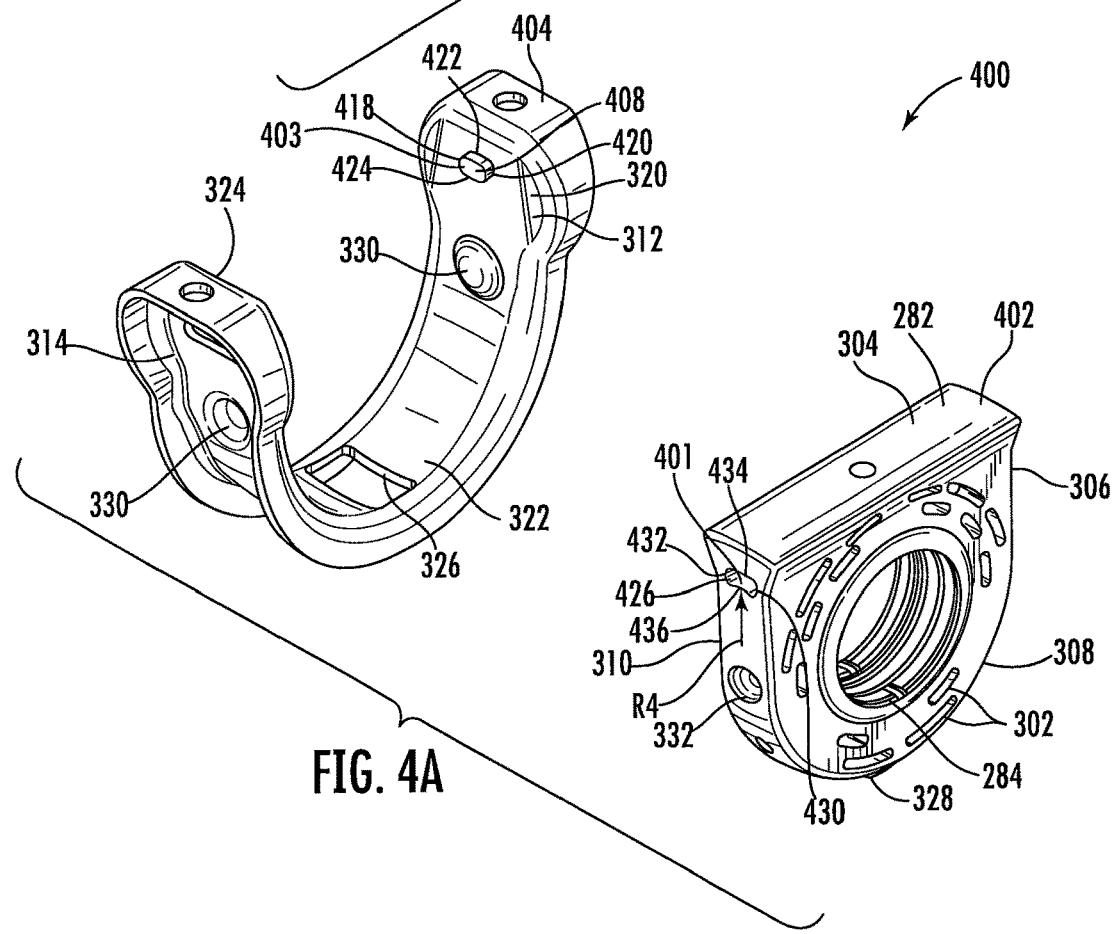
FIG. 4A is a schematic exploded-view of the one or more center bearing assemblies according to the embodiment illustrated in FIG. 4 of the disclosure.
Figure 4B:
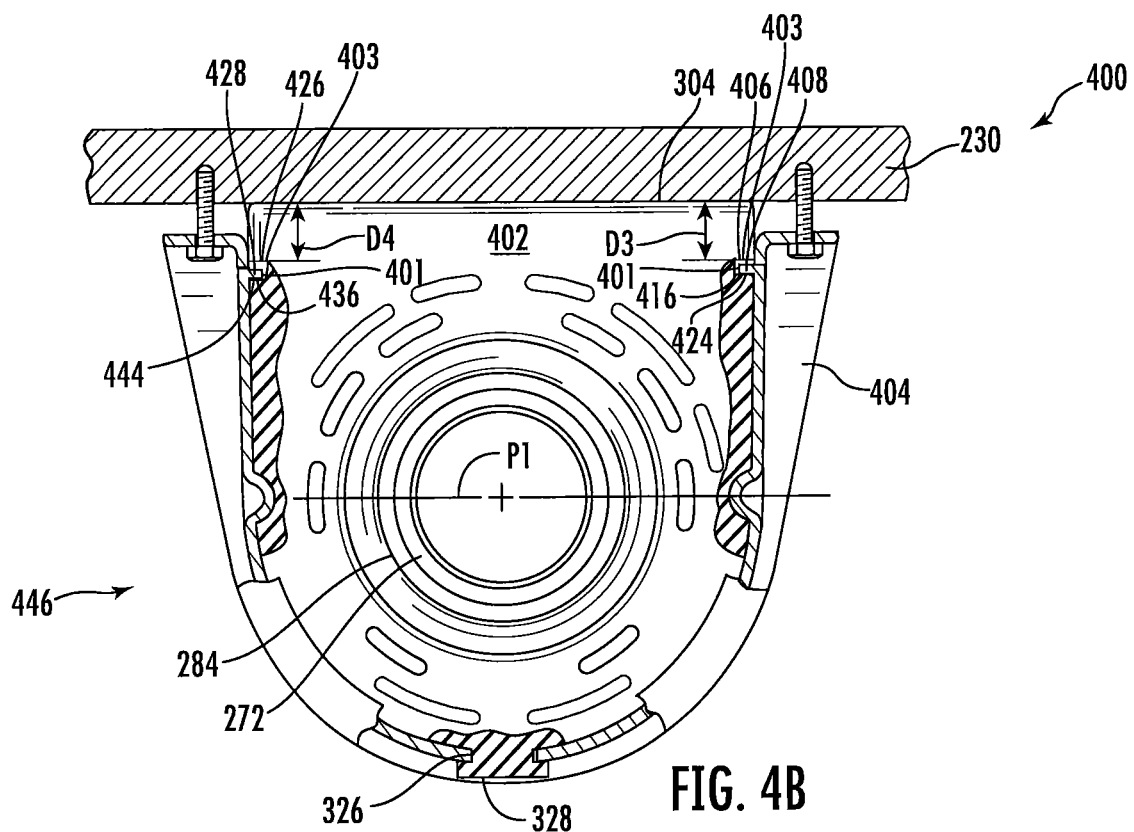
FIG. 4B is a partial cut-away schematic front-view of the one or more center bearing assemblies illustrated in FIGS. 4 and 4A, when the one or more center bearing assemblies are in a partially installed position.
Figure 4C:
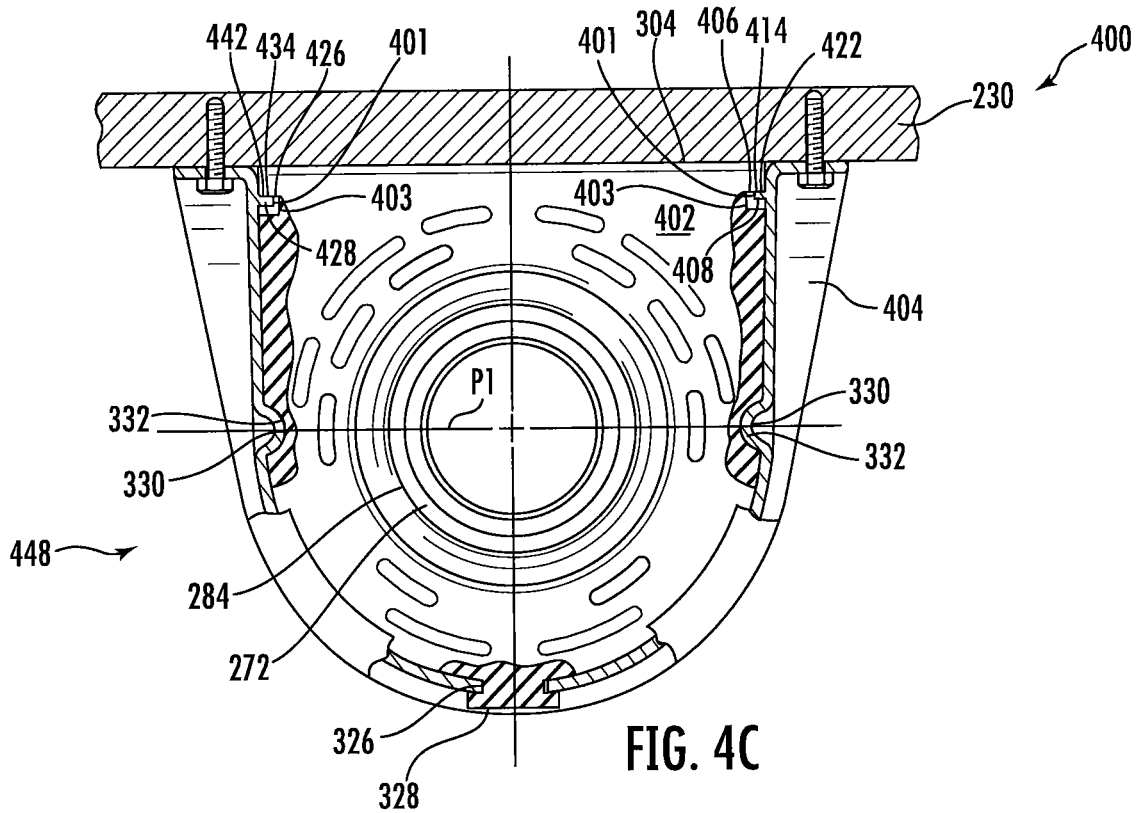
FIG. 4C is a partial cut-away schematic front-view of the one or more center bearing assemblies illustrated in FIGS. 4-4B, when the one or more center bearing assemblies are in a fully assembled position.

FIGS. 4-4C provide a schematic exploded view of a center bearing assembly 400 according to an alternative embodiment of the disclosure. The center bearing assembly 400 illustrated in FIGS. 4-4C is the same as the center bearing assembly 200 illustrated in FIGS. 3-3E, except where specifically noted below. As illustrated in FIGS. 4-4C of the disclosure and as a non-limiting example, the center bearing assembly includes a cushion portion 402 and a bracket portion 404. In accordance with this embodiment of the disclosure, the cushion portion 402 does not include the one or more first and/or second extending members 336 and/or 356 and the bracket portion 404 does not include the one or more first and/or second receiving portions 334 and/or 354 described and illustrated in relation to FIGS. 3-3E of the disclosure.

As best seen in FIGS. 4-4C of the disclosure and as a non-limiting example, the center bearing assembly 400 may include one or more first retention portions 401 and one or more second retention portions 403. The one or more first and second retention portions 401 and 403 of the center bearing assembly 400 may be used in order to retain at least a portion of the cushion portion 402 relative to the bracket portion 404. According to the embodiment illustrated in FIG. 4B of the disclosure and as a non-limiting example, when the center bearing assembly 400 is in a first position 446, the cushion portion 402 may be selectively rotatable or movable relative to the bracket portion 404 of the center bearing assembly 400. Additionally, in accordance with the embodiment illustrated in FIG. 4C and as a non-limiting example, when the center bearing assembly 400 is in a second position 448, at least a portion of the one or more first retention portions 401 of the cushion portion 402 are engaged with at least a portion of the one or more second retention portions 403 of the bracket portion 404 of the center bearing assembly 400. It is within the scope of this disclosure and as a non-limiting example that the first position 446 may be a partially installed position on the vehicle (not shown) and the second position 448 may be a fully installed position on the vehicle (not shown). The interaction and/or engagement between the one or more first and second retention members 401 and 403 of the center bearing assembly 400, aids in preventing the cushion portion 402 from rotating relative to the bracket portion 404. As a result, this aids in reducing and/or eliminating the overall amount of movement experienced by the cushion portion 402 once in the second fully installed position 448 which in turn reduces and/or eliminates the overall amount of NVH in driveline and provides the vehicle (not shown) with superior ride characteristics.

It is within the scope of this disclosure and as a non-limiting example that the one or more first retention portions 401 of the cushion portion 402 may be one or more receiving portions 406 and/or 426 as described and illustrated in relation to FIGS. 4-4C of the disclosure. Additionally, it is within the scope of this disclosure and as a non-limiting example that the one or more second retention portions 403 of the bracket portion 404 may be one or more extending portions 408 and/or 428 as described and illustrated in relation to FIGS. 4-4C of the disclosure.

According to the embodiment illustrated in FIG. 4 of the disclosure and as a non-limiting example, one or more first receiving portions 406 may extend inward into the cushion portion 402 from at least a portion of the second surface 306 of the outer peripheral surface 282 of the cushion portion 402. The one or more first receiving portions 406 may have a size and shape to receive and/or retain at least a portion of one or more first extending portions 408 extending outward from at least a portion of the first surface 320 of the inner surface 312 of the bracket portion 404 of the center bearing assembly 400. It is within the scope of this disclosure and as a non-limiting example that the one or more first extending portions 408 may have a substantially obround shape, a substantially quonset shape, a substantially cube shape and/or a substantially cuboid shape. Additionally, it is within the scope of this disclosure and as a non-limiting example that the one or more first receiving portions 406 may have a substantially square shape, a substantially rectangular shape and/or a substantially arcuate shape. It is therefore to be understood that the one or more first receiving portions 406 may extend along a radius R3 relative to the plane P1.

As best seen in FIG. 4 of the disclosure and as a non-limiting example, the one or more first receiving portions 406 in the cushion portion 404 may have a first end 410, a second end 412, a top surface 414 and a bottom surface 416. Additionally, as best seen in FIG. 4A of the disclosure and as a non-limiting example, the one or more first extending portions 408 of the bracket portion 404 may have a first end 418, a second end 420, a top surface 422 and a bottom surface 424. During assembly of the various components of the drivetrain assembly 202 of the vehicle (not shown), the cushion portion 402 of the center bearing assembly 400 is prevented from pivoting or rotating beyond a pre-determined amount based on the size of the one or more first receiving portions 406 in the in the cushion portion 402. When at least a portion of the first end 418 of the one or more first extending portions 408 may be in direct contact with at least a portion of the first end 410 of the one or more first receiving portions 406 in the cushion portion 402, the cushion portion 402 is at a first maximum articulation portion (not shown). Additionally, when at least a portion of the second end 420 of the one or more first extending portions 408 are in direct contact with at least a portion of the second end 412 of the one or more first receiving portions 406 in the cushion portion 402, the cushion portion 402 is at a second maximum articulation position (not shown). This aids in preventing the over articulation, rotation and/or pivoting of the center bearing assembly 400 during assembly of the various components of the drivetrain assembly 202.

Extending inward into the cushion portion 402 from at least a portion of the fourth surface 310 of the outer peripheral surface 282 is one or more second receiving portions 426. The one or more second receiving portions 426 in the cushion portion 402 may be of a size and shape to receive and/or retain at least a portion of one or more second extending portions 428 extend outward from at least a portion of the third surface 324 of the bracket portion 404. It is within the scope of this disclosure and as a non-limiting example that the one or more second extending portions 428 may have a substantially obround shape, a substantially quonset shape, a substantially cube shape and/or a substantially cuboid shape. Additionally, it is within the scope of this disclosure and as a non-limiting example that the one or more second receiving portions 426 in the cushion portion 402 may have a substantially square shape, a substantially rectangular shape and/or a substantially arcuate shape. It is therefore to be understood that the one or more second receiving portions 426 may extend along a radius R4 relative to the plane P1 of the center bearing assembly 400.

As best seen in FIG. 4A of the disclosure and as a non-limiting example, the one or more second receiving portions 426 may have a first end 430, a second end 432, a top surface 434 and a bottom surface 436. Additionally, as best seen in FIG. 4 of the disclosure and as a non-limiting example, the one or more second extending portions 428 may have a first end 438, a second end 440, a top surface 442 and a bottom surface 444. During assembly of the various components of the drivetrain assembly 202, the cushion portion 402 of the center bearing assembly 400 is prevented from pivoting or rotating a pre-determined amount based on the size of the one or more second receiving portions 426 in the in the cushion portion 402. When at least a portion of the first end 438 of the one or more second extending portions 428 are in direct contact with at least a portion of the first end 430 of the one or more second receiving portions 426 in the cushion portion 402, the cushion portion 402 is at a first maximum articulation portion (not shown). Additionally, when at least a portion of the second end 440 of the one or more second extending portions 428 are in direct contact with at least a portion of the second end 432 of the one or more second receiving portions 426 in the cushion portion 402, the cushion portion 402 is at a second maximum articulation position (not shown). This aids in preventing the over articulation, rotation and/or pivoting of the center bearing assembly 400 during assembly of the various components of the drivetrain assembly 202.

In accordance with the embodiment illustrated in FIG. 4B of the disclosure and as a non-limiting example, when the center bearing assembly 400 is in a partially installed portion 446, the cushion portion 402 and the one or more bearing assemblies 272 are able to freely articulate, pivot and/or rotate relative to the bracket portion 404. Additionally, when the center bearing assembly 400 is in the partially installed portion 446 illustrated in FIG. 4B, no part of the one or more first and/or second extending members 408 and/or 428 of the bracket portion 404 are in direct contact with the top surfaces 414 and 434 of the first and second receiving portions 406 and 426 in the cushion portion 402. It is within the scope of this disclosure and as a non-limiting example that when the center bearing assembly 400 is in the partially installed position 446, at least a portion of the bottom surfaces 424 and 444 of the one or more first and/or second extending members 408 and/or 428 may be in direct contact with or disposed proximate to at least a portion of the bottom surfaces 416 and 436 of the first and second receiving portions 406 and 426 in the cushion portion 402.

When the center bearing assembly 400 is in the position illustrated in FIG. 4C, the center bearing assembly 400 may be in a fully installed position 448. As the cushion portion 402 transitions between the partially installed position 446 and the fully installed position 448 illustrated in FIGS. 4B and 4C, the cushion portion 402 is compressed inward toward the bracket portion 404 of the center bearing assembly 400. In accordance with the embodiment illustrated in FIG. 4C and as a non-limiting example, when the cushion portion 402 is in the fully installed position 448, at least a portion of the top surfaces 422 and 442 of the one or more first and/or second extending members 408 and/or 428 are in direct contact with at least a portion of the top surfaces 414 and 434 of the first and second receiving portions 406 and 426 in the cushion portion 402. The physical interaction of the one or more first and/or second extending members 408 and/or 428 and the first and second receiving portions 406 and 426 aids in increasing the overall amount of force between the cushion portion 402, the bracket portion 404 and/or the support surface 230. This aids in ensuring that the cushion portion 402 experiences little to no articulating, pivoting and/or rotating once in the fully installed position 448 during all operating conditions.

According to the embodiment illustrated in FIG. 4B and as a non-limiting example, when the center bearing assembly 400 is in the partially installed position 446, at least a portion of the first surface 304 of the outer peripheral surface 282 of the cushion portion 402 may be in direct contact with at least a portion of the support surface 230. When in this position, little to no force may be applied onto the cushion portion 402 of the center bearing assembly 400. This allows the one or more bearing assemblies 272 and/or the cushion portion 402 to freely articulate, pivot and/or rotate, thereby making the assembly and/or removal of the various components of the drivetrain assembly 202 easier. Additionally, when in the partially installed position 446, the top surfaces 414 and 434 of the first and second receiving portions 406 and 426 may be disposed a distance D3 and D4 from the first surface 304 of the cushion portion 402 respectively. It is within the scope of this disclosure and as a non-limiting example that the distances D3 and D4 may be determined based on the operating temperatures of the center bearing assembly 400, the physical properties, the mechanical properties, the expansion properties, the contraction properties and/or the compressive properties of the material of the cushion portion 402. An accurate determination of the distances D3 and D4 is critical to the overall life, durability, operability and functionality of the center bearing assembly 400 within the drivetrain assembly 202. This aids in ensuring that the one or more first and/or second extending members 408 and/or 428 of the cushion portion 402 remain in direct contact with the slots 406 and 434 of the cushion portion 402 at all times and in all operating conditions for the vehicle (not shown). It is therefore to be understood that this aids in ensuring that the cushion portion 402 experiences little to no articulation, pivoting and/or rotating once in the fully installed position 448, thereby providing a more robust and durable center bearing assembly 400.

FIGS. 5-5B provide a schematic illustration of a center beating assembly 500 according to another embodiment of the disclosure. The center bearing assembly 500 illustrated in FIGS. 5-5B is the same as the center bearing assemblies 200 and 400 illustrated in FIGS. 3-4C, except where specifically noted below. As illustrated in FIGS. 5A and 5B of the disclosure and as a non-limiting example, the center bearing assembly 500 utilizes the cushion portion 268 described and illustrated in relation to FIGS. 3-3E of the disclosure.

As best seen in FIGS. 5-5B of the disclosure and as a non-limiting example, the center bearing assembly 500 may include the one or more first retention portions 331 and one or more second retention portions 501. The one or more first and second retention portions 331 and 501 of the center bearing assembly 500 may be used in order to retain at least a portion of the cushion portion 268 relative to a bracket portion 502. According to the embodiment illustrated in FIG. 5A of the disclosure and as a non-limiting example, when the center bearing assembly 500 is in a first position 520, the cushion portion 268 may be selectively rotatable or movable relative to the bracket portion 502 of the center bearing assembly 500. Additionally, in accordance with the embodiment illustrated in FIG. 5B and as a non-limiting example, when the center bearing assembly 500 is in a second position 522, at least a portion of the one or more first retention portions 331 of the cushion portion 268 are engaged with at least a portion of the one or more second retention portions 501 of the bracket portion 502 of the center bearing assembly 500. It is within the scope of this disclosure and as a non-limiting example that the first position 520 may be a partially installed position on the vehicle (not shown) and the second position 522 may be a fully installed position on the vehicle (not shown). The interaction and/or engagement between the one or more first and second retention members 331 and 501 of the center bearing assembly 500, aids in preventing the cushion portion 268 from rotating relative to the bracket portion 502. As a result, this aids in reducing and/or eliminating the overall amount of movement experienced by the cushion portion 268 once in the second fully installed position 522 which in turn reduces and/or eliminates the overall amount of NVH in driveline and provides the vehicle (not shown) with superior ride characteristics.

It is within the scope of this disclosure and as a non-limiting example that the one or more second retention portions 501 of the bracket portion 502 may be one or more receiving portions 504 and/or 506 as described and illustrated in relation to FIGS. 5-5B of the disclosure.

In accordance with the embodiment illustrated in FIGS. 5-5B of the disclosure and as a non-limiting example, the bracket portion 502 of the center bearing assembly 500 may have one or more first receiving portions 504 in the first surface 320 and one or more second receiving portions 506 in the third surface 324 of the bracket portion 502. The first and second receiving portions 504 and 506 in the bracket portion 502 may be used in place of or in combination with the one or more first receiving portions 334, the one or more second receiving portions 354, the one or more first extending portions 408 or the one or more second extending portions 428 previously described herein. The first and the second receiving portions 504 and 506 in the bracket portion 502 are the same as the one or more first and/or second receiving portions 334 and/or 354 described and illustrated in relation to FIGS. 3-3E of the disclosure, except where specifically noted below.

As best seen in FIG. 5 of the disclosure and as a non-limiting example, the one or more first receiving portions 504 may further include one or more radially extending portions 508 extending inward toward the one or more protruding portions 330 from at least a portion of the bottom surface 344 of the one or more first receiving portions 504. It is within the scope of this disclosure and as a non-limiting example, that the one or more radially extending portions 508 may extend substantially parallel to a radial centerline RC1 of the one or more bearing assemblies 272 of the center bearing assembly 500. By locating the one or more radially extending portions 508 of the one or more first receiving portions 504 in this location, it aids in ensuring that the center bearing assembly 500 is properly assembled into its ideal operating position thereby improving the overall life and durability of the center bearing assembly 500. This divides the one or more first receiving portions 504 in the bracket portion 502 into one or more articulation portions 510 and one or more locking portions 512 and provides a center bearing assembly 500 that is self-aligning. It is within the scope of this disclosure and as a non-limiting example that the one or more first receiving portions 504 in the bracket portion 502 may be substantially T-shaped.

According to the embodiment illustrated in FIG. 5 of the disclosure and as a non-limiting example, the one or more second receiving portions 506 may further include one or more radially extending portions 514 extending inward toward the one or more protruding portions 330 from at least a portion of the bottom surface 364 of the one or more second receiving portions 506. It is within the scope of this disclosure and as a non-limiting example, that the one or more radially extending portions 514 may extend substantially parallel to the radial centerline RC1 of the one or more bearing assemblies 272. By locating the one or more radially extending portions 514 of the one or more second receiving portions 506 in this location, it aids in ensuring that the center bearing assembly 500 is properly assembled into its ideal operating position thereby improving the overall life and durability of the center bearing assembly 500. This divides the one or more second receiving portions 506 in the bracket portion 502 into one or more articulation portions 516 and one or more locking portions 518 and provides a center bearing assembly 500 that is self-aligning. It is within the scope of this disclosure and as a non-limiting example that the one or more second receiving portions 506 in the bracket portion 502 may be substantially T-shaped.

When the center bearing assembly 500 is in the partially installed position 520 illustrated in FIG. 5A, the one or more first and/or second extending members 336 and/or 356 on the cushion portion 268 are located in the one or more articulation portions 510 and 516 of the first and second receiving portions 504 and 506 in the bracket portion 502. In this position, the cushion portion 268 and the one or more bearing assemblies 272 are allowed to articulate, pivot and/or rotate relative to the bracket portion 502 and the support surface 230 a pre-determined amount as needed in order to aid in making the assembly process of the drivetrain assembly 202 easier.

Once the center bearing assembly 500 has transitioned into a fully installed position 522 as illustrated in FIG. 5B, the one or more first and/or second extending members 336 and/or 356 on the cushion portion 268 are located in the one or more locking portions 512 and 518 of the first and second receiving portions 504 and 506 in the bracket portion 502. When in this position, at least a portion of the first end 336 and 366 and/or the second end 338 and 368 of the one or more first and/or second extending members 336 and/or 356 may be in direct contact with at least a portion of a first side 524 and 526 and/or a second side 528 and 530 of the one or more locking portions 512 and 518 of the first and second receiving portions 504 and 506 in the bracket portion 502. As a result, when in the fully installed position 522, the cushion portion 268 and/or the one or more bearing assemblies 272 are prevented from articulating, pivoting and/or rotating relative to the bracket portion 502 and the support surface 230 when in operation. This is achieved by the direct physical interaction between the one or more first and/or second extending members 336 and/or 356 and the one or more locking portions 512 and 518 of the first and second receiving portions 504 and 506 in the bracket portion 502.

As best seen in FIG. 5A of the disclosure and as a non-limiting example, when the center bearing assembly 500 is in the partially installed position 520, at least a portion of the first surface 304 of the outer peripheral surface 282 of the cushion portion 268 may be in direct contact with at least a portion of the support surface 230. When in this position little to no force may be applied onto the cushion portion 268 of the center bearing assembly 500. This allows the one or more bearing assemblies 272 and/or the cushion portion 268 to freely articulate, pivot and/or rotate, thereby making the assembly and/or removal of the various components of the drivetrain assembly 202 easier. Additionally, when in the partially installed position 520, the one or more first and/or second extending members 336 and/or 356 may be disposed a distance D5 from the first surface 304 of the cushion portion 268. It is within the scope of this disclosure and as a non-limiting example that the distance D5 may be determined based on the operating temperatures of the center bearing assembly 500, the physical properties, the mechanical properties, the expansion properties, the contraction properties and/or the compressive properties of the material of the cushion portion 268. An accurate determination of the distance D5 is critical to the overall life, durability, operability and functionality of the center bearing assembly 500 within the drivetrain assembly 202. This aids in ensuring that at least a portion of the one or more first and/or second extending members 336 and/or 356 of the cushion portion 268 are received within at least a portion of the one or more locking portions 512 and 518 of the first and second receiving portions 504 and 506 in the bracket portion 502 once in the fully installed position 522. Additionally, this aids in ensuring that at least a portion of the one or more first and/or second extending members 336 and/or 356 remain within at least a portion of the one or more locking portions 512 and 518 of the first and second receiving portions 504 and 506 at all times and during all operating conditions. It is therefore to be understood that this aids in ensuring that the cushion portion 268 experiences little to no articulation, pivoting and/or rotating once in the fully installed position 522, thereby providing a more robust and durable center bearing assembly 500.

Figure 6:
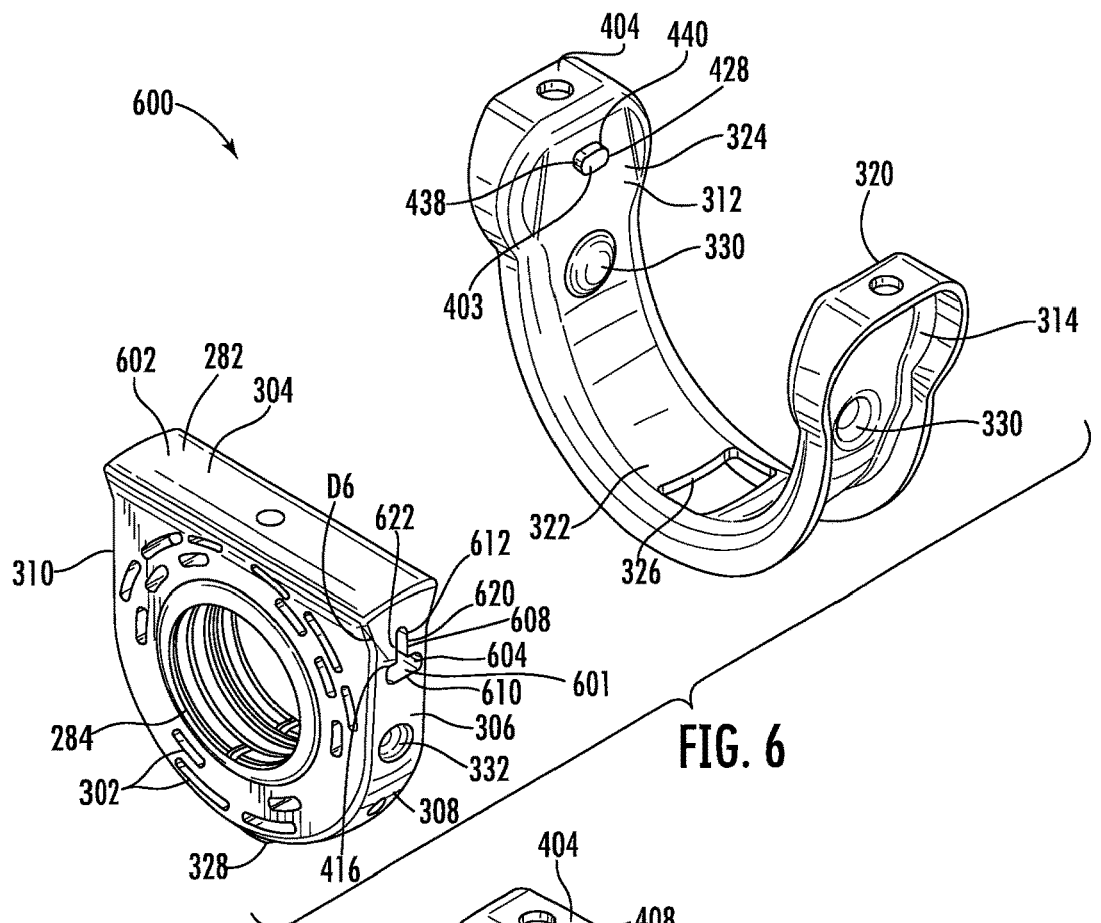
FIG. 6 is a schematic perspective exploded view of a center bearing assembly according to yet another embodiment of the disclosure.
Figure 6A:
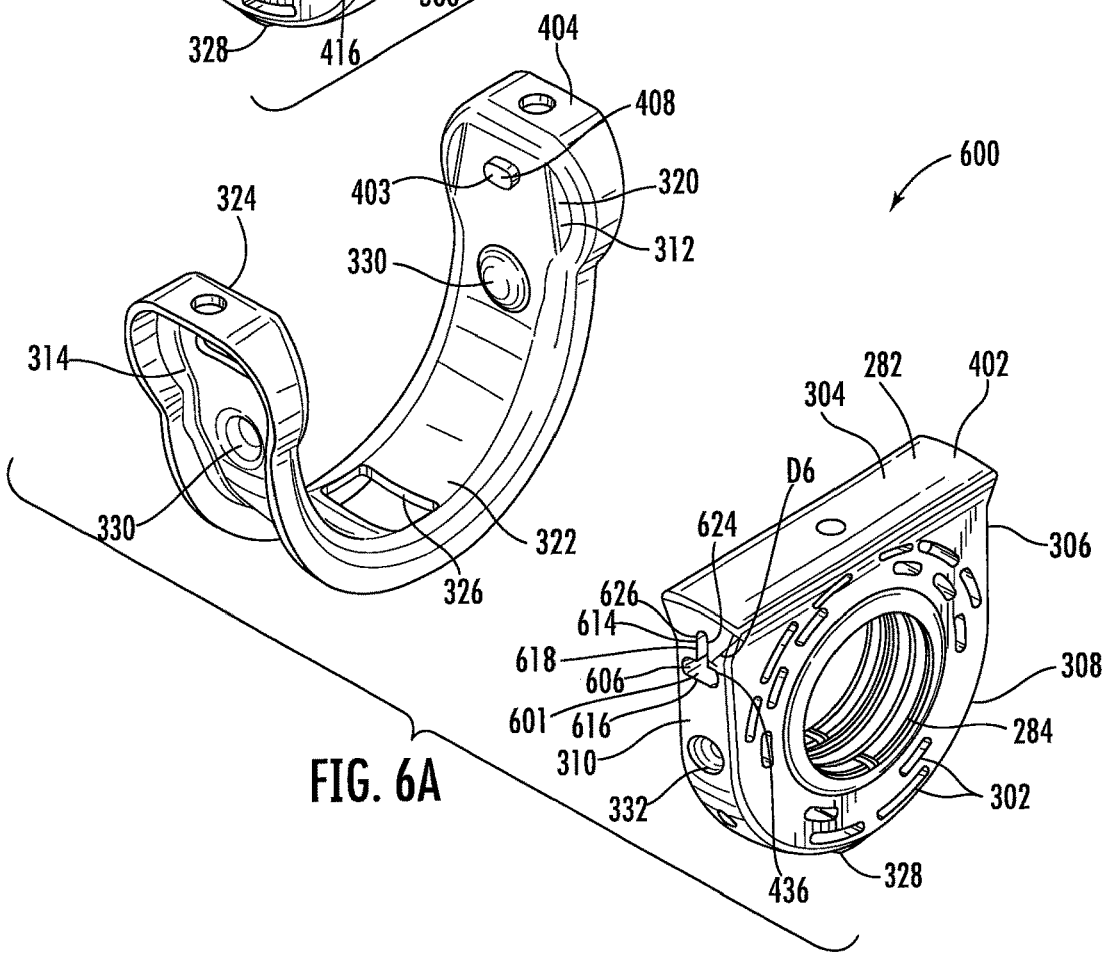
FIG. 6A is a schematic perspective exploded view of the center bearing assembly illustrated in FIG. 6 of the disclosure.

FIGS. 6 and 6A provide a schematic exploded view of a center bearing assembly 600 according to yet another embodiment of the disclosure. The center bearing assembly 600 illustrated in FIGS. 6 and 6A is the same as the center bearing assemblies 200, 400 and 500 illustrated in FIGS. 3-5B, except where specifically noted below. As illustrated in FIGS. 6 and 6A of the disclosure and as a non-limiting example, the center bearing assembly 600 utilizes the bracket portion 404 described and illustrated in relation to FIGS. 4-4C of the disclosure.

As best seen in FIGS. 6 and 6A of the disclosure and as a non-limiting example, the center bearing assembly 600 may include one or more first retention portions 601 and the one or more second retention portions 403. The one or more first and second retention portions 601 and 403 of the center bearing assembly 600 may be used in order to retain at least a portion of the cushion portion 602 relative to the bracket portion 404. When the center bearing assembly 600 is in a first position (not shown), the cushion portion 602 may be selectively rotatable or movable relative to the bracket portion 404 of the center bearing assembly 600. Additionally, when the center bearing assembly 600 is in a second position (not shown), at least a portion of the one or more first retention portions 601 of the cushion portion 602 are engaged with at least a portion of the one or more second retention portions 403 of the bracket portion 404 of the center bearing assembly 600. It is within the scope of this disclosure and as a non-limiting example that the first position (not shown) may be a partially installed position on the vehicle (not shown) and the second position (not shown) may be a fully installed position on the vehicle (not shown). The interaction and/or engagement between the one or more first and second retention members 601 and 403 of the center bearing assembly 600, aids in preventing the cushion portion 602 from rotating relative to the bracket portion 404. As a result, this aids in reducing and/or eliminating the overall amount of movement experienced by the cushion portion 602 once in the second fully installed position (not shown) which in turn reduces and/or eliminates the overall amount of NVH in driveline and provides the vehicle (not shown) with superior ride characteristics.

It is within the scope of this disclosure and as a non-limiting example that the one or more first retention portions 601 of the cushion portion 602 may be one or more receiving portions 604 and/or 606 as described and illustrated in relation to FIGS. 6 and 6A of the disclosure.

In accordance with the embodiment illustrated in FIGS. 6 and 6A of the disclosure and as a non-limiting example, the center bearing assembly 600 may include a cushion portion 602 having one or more first receiving portions 604 in the second surface 306 of the outer peripheral surface 282 and one or more second receiving portions 606 in the fourth surface of the outer peripheral surface 282 of the cushion portion 602. The first and second receiving portions 604 and 606 in the cushion portion 602 may be used in place of or in combination with the one or more first receiving portions 406, the one or more second receiving portions 426, the one or more first extending portions 336 or the one or more second extending portions 356 previously described herein. The first and the second receiving portions 604 and 606 in the cushion portion 602 are the same as the first and second receiving portions 406 and 426 described and illustrated in relation to FIGS. 4-4C of the disclosure, except where specifically noted below.

As best seen in FIG. 6 of the disclosure and as a non-limiting example, the one or more first receiving portions 604 may further include one or more radially extending portions 608 extending outward away from the one or more recessed portions 332 from at least a portion of the bottom surface 416 of the one or more first receiving portions 604. It is within the scope of this disclosure and as a non-limiting example, that the one or more radially extending portions 608 may extend substantially parallel to the radial centerline RC1 of the one or more bearing assemblies 272 of the center bearing assembly 600. By locating the one or more radially extending portions 608 of the one or more first receiving portions 604 in this location, it aids in ensuring that the center bearing assembly 600 is properly assembled into its ideal operating position thereby improving the overall life and durability of the center bearing assembly 600. This divides the one or more first receiving portions 604 in the cushion portion 602 into one or more articulation portions 610 and one or more locking portions 612 and provides a center bearing assembly 600 that is self-aligning. It is within the scope of this disclosure and as a non-limiting example that the one or more first receiving portions 604 in the cushion portion 602 may have a substantially upside down T-shape.

According to the embodiment illustrated in FIG. 6A of the disclosure and as a non-limiting example, the one or more second receiving portions 606 may further include one or more radially extending portions 614 extending inward toward the one or more recessed portions 332 from at least a portion of the bottom surface 436 of the one or more second receiving portions 606. It is within the scope of this disclosure and as a non-limiting example, that the one or more radially extending portions 614 may extend substantially parallel to the radial centerline RC1 of the one or more bearing assemblies 272. By locating the one or more radially extending portions 614 of the one or more second receiving portions 606 in this location, it aids in ensuring that the center bearing assembly 600 is properly assembled into its ideal operating position thereby improving the overall life and durability of the center bearing assembly 600. This divides the one or more second receiving portions 606 in the cushion portion 602 into one or more articulation portions 616 and one or more locking portions 618 and provides a center bearing assembly 600 that is self-aligning. It is within the scope of this disclosure and as a non-limiting example that the one or more second receiving portions 606 in the cushion portion 602 may have a substantially upside down T-shape.

When the center bearing assembly 600 is in the partially installed position (not shown), the one or more first and/or second extending members 408 and/or 428 on the bracket portion 404 are located in the one or more articulation portions 610 and 616 of the first and second receiving portions 604 and 606 in the cushion portion 602. In this position, the cushion portion 602 and the one or more bearing assemblies 272 are allowed to articulate, pivot and/or rotate relative to the bracket portion 404 and the support surface 230 a pre-determined amount as needed in order to aid in making the assembly process of the drivetrain assembly 202 easier.

Once the center bearing assembly 600 has transitioned into a fully installed position (not shown), the one or more first and/or second extending members 408 and/or 428 on the bracket portion 404 are located in the one or more locking portions 612 and 618 of the first and second receiving portions 604 and 606 in the bracket portion 602. When in this position, at least a portion of the first end 418 and 438 and/or the second end 420 and 440 of the one or more first and/or second extending members 408 and/or 428 may be in direct contact with at least a portion of a first side 620 and 622 and/or a second side 624 and 626 of the one or more locking portions 612 and 618 of the first and second receiving portions 604 and 606 in the cushion portion 602. As a result, when in the fully installed position (not shown), the cushion portion 602 and/or the one or more bearing assemblies 272 are prevented from articulating, pivoting and/or rotating relative to the bracket portion 404 and the support surface 230 when in operation. This is achieved by the direct physical interaction between the one or more first and/or second extending members 408 and/or 428 and the one or more locking portions 612 and 618 of the first and second receiving portions 604 and 606 in the cushion portion 602.

Additionally, when the center bearing assembly 600 is in the partially installed position (not shown), at least a portion of the first surface 304 of the outer peripheral surface 282 of the cushion portion 602 may be in direct contact with at least a portion of the support surface 230. When in this position little to no force may be applied onto the cushion portion 602 of the center bearing assembly 600. This allows the one or more bearing assemblies 272 and/or the cushion portion 602 to freely articulate, pivot and/or rotate, thereby making the assembly and/or removal of the various components of the drivetrain assembly 202 easier. Additionally, when in the partially installed position (not shown), the one or more first and/or second extending members 408 and/or 428 may be disposed a distance D6 from the first surface 304 of the cushion portion 602. It is within the scope of this disclosure and as a non-limiting example that the distance D6 may be determined based on the operating temperatures of the center bearing assembly 600, the physical properties, the mechanical properties, the expansion properties, the contraction properties and/or the compressive properties of the material of the cushion portion 602. An accurate determination of the distance D6 is critical to the overall life, durability, operability and functionality of the center bearing assembly 600 within the drivetrain assembly 202. This aids in ensuring that at least a portion of the one or more first and/or second extending members 408 and/or 428 of the bracket portion 404 are received within at least a portion of the one or more locking portions 612 and 618 of the first and second receiving portions 604 and 606 in the cushion portion 602 once in the fully installed position (not shown). Additionally, this aids in ensuring that at least a portion of the one or more first and/or second extending members 408 and/or 428 remain within at least a portion of the one or more locking portions 612 and 618 of the first and second receiving portions 604 and 606 at all times and during all operating conditions. It is therefore to be understood that this aids in ensuring that the cushion portion 602 experiences little to no articulation, pivoting and/or rotating once in the fully installed position (not shown), thereby providing a more robust and durable center bearing assembly 600.

Figure 7:
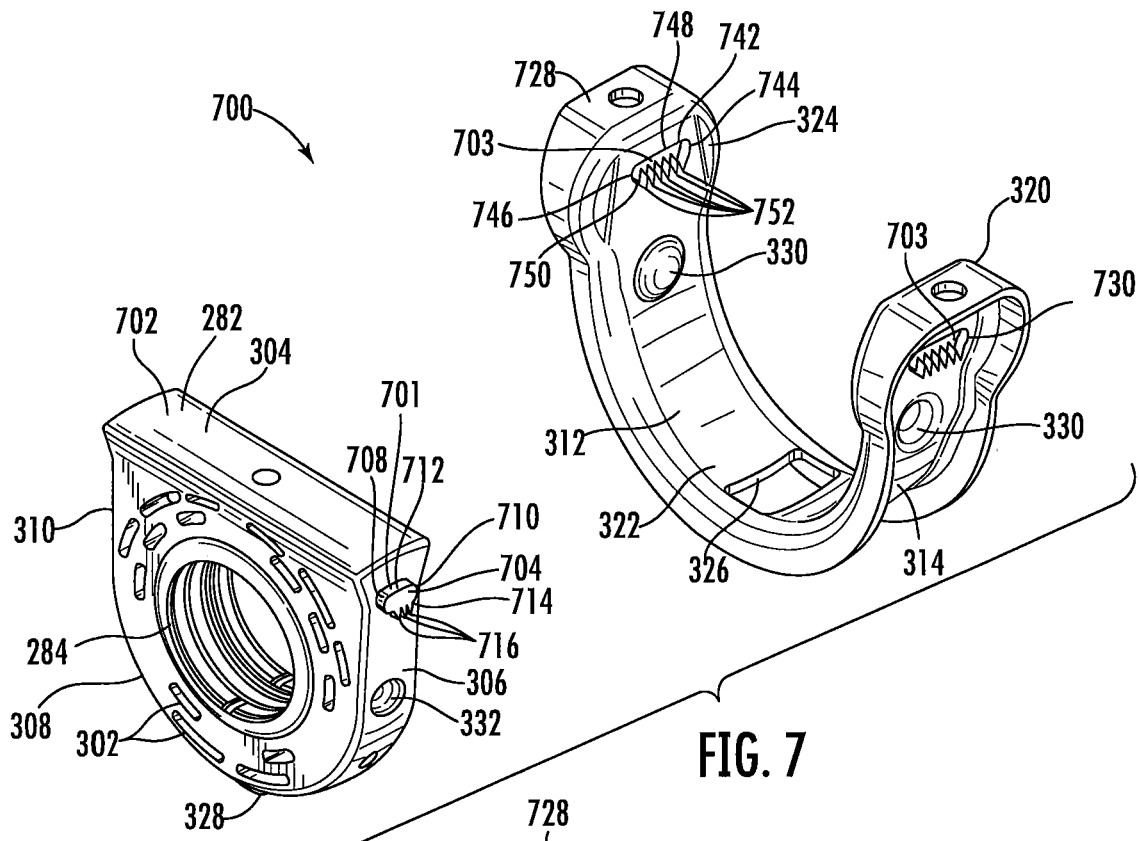
FIG. 7 is a schematic perspective exploded view of a center bearing assembly according to still yet another embodiment of the disclosure.
Figure 7A:
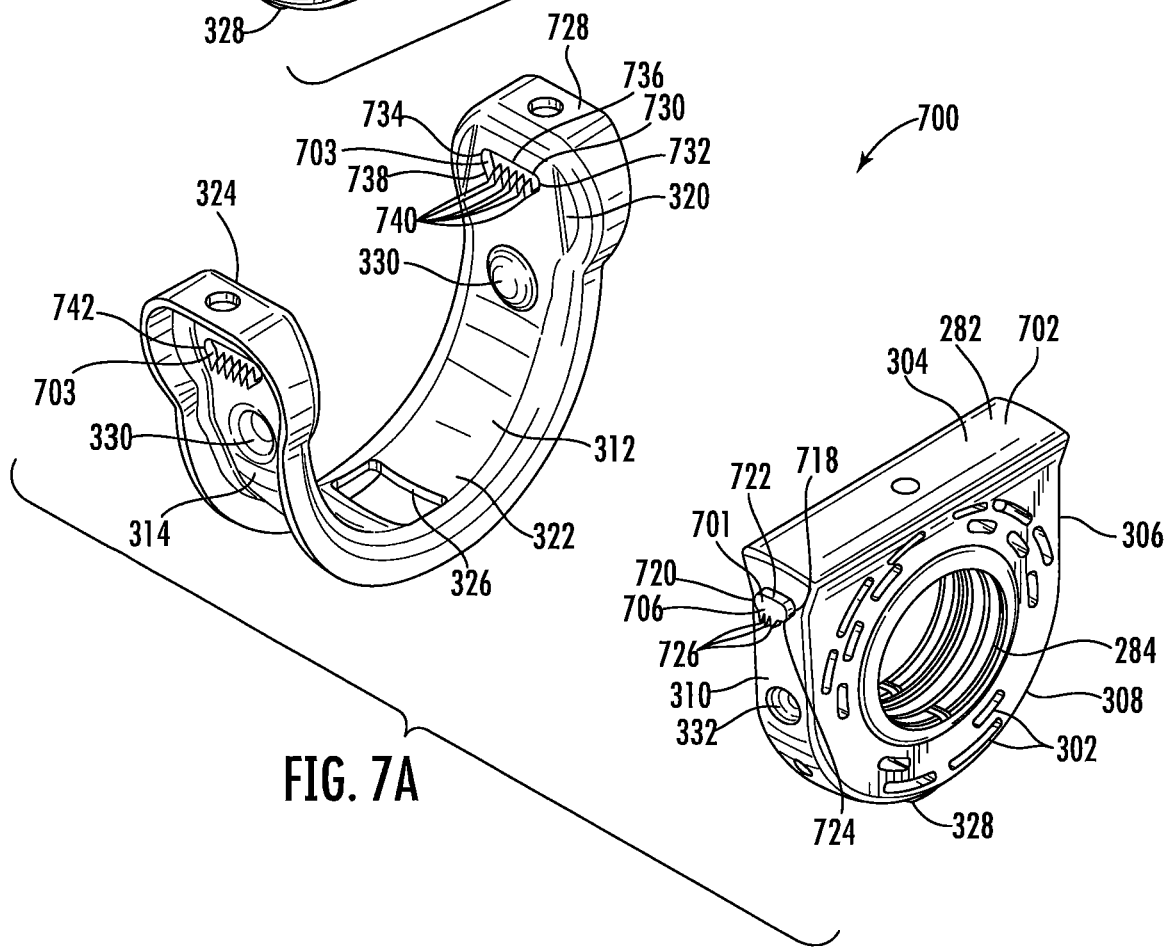
FIG. 7A is a schematic perspective exploded view of the center bearing assembly according to the embodiment illustrated in FIG. 7 of the disclosure.
Figure 7B:
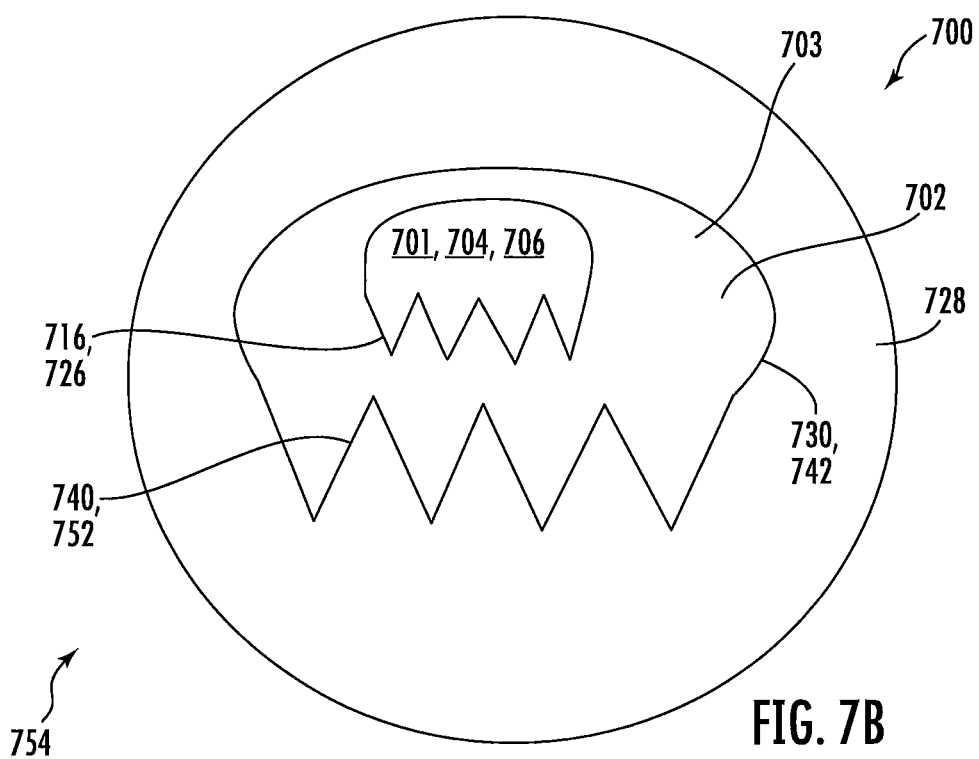
FIG. 7B is a schematic detailed view of a portion of the center bearing assembly illustrated in FIGS. 7 and 7A of the disclosure when the center bearing assembly is a partially installed position.
Figure 7C:
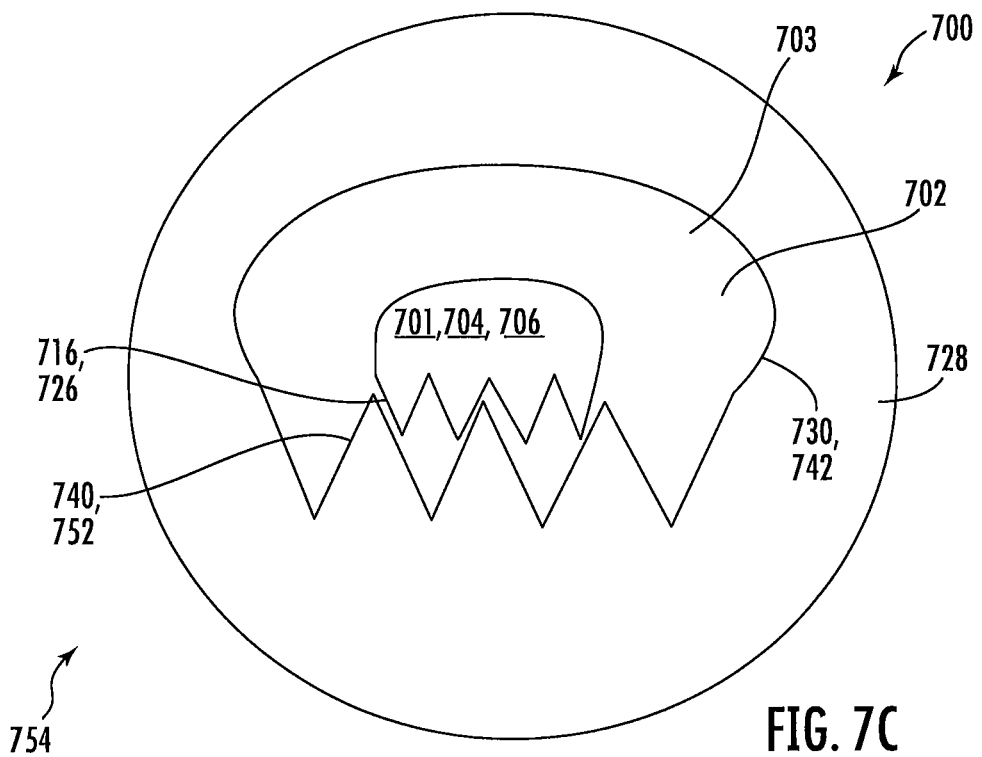

FIGS. 7-7C provide a schematic illustration of a center bearing assembly 700 according to still yet another embodiment of the disclosure. The center bearing assembly 700 illustrated in FIGS. 7-7C is the same as the center bearing assemblies 200, 400, 500 and 600 illustrated in FIGS. 3-6A, except where specifically noted below. In accordance with the embodiment illustrated in FIGS. 7 and 7A of the disclosure and as a non-limiting example, the center bearing assembly 700 includes a cushion portion 702 having one or more first extending portions 704 and one or more second extending portions 706.

As best seen in FIGS. 7-7C of the disclosure and as a non-limiting example, the center bearing assembly 700 may include one or more first retention portions 701 and one or more second retention portions 703. The one or more first and second retention portions 701 and 703 of the center bearing assembly 700 may be used in order to retain at least a portion of the cushion portion 702 relative to a bracket portion 728. When the center bearing assembly 700 is in a first position 754, the cushion portion 702 may be selectively rotatable or movable relative to the bracket portion 728 of the center bearing assembly 700. Additionally, when the center bearing assembly 700 is in a second position 756, at least a portion of the one or more first retention portions 701 of the cushion portion 702 are engaged with at least a portion of the one or more second retention portions 703 of the bracket portion 728 of the center bearing assembly 700. It is within the scope of this disclosure and as a non-limiting example that the first position 754 may be a partially installed position on the vehicle (not shown) and the second position 756 may be a fully installed position on the vehicle (not shown). The interaction and/or engagement between the one or more first and second retention members 701 and 703 of the center bearing assembly 700, aids in preventing the cushion portion 702 from rotating relative to the bracket portion 728. As a result, this aids in reducing and/or eliminating the overall amount of movement experienced by the cushion portion 702 once in the second fully installed position 756 which in turn reduces and/or eliminates the overall amount of NVH in driveline and provides the vehicle (not shown) with superior ride characteristics.

It is within the scope of this disclosure and as a non-limiting example that the one or more first retention portions 701 of the cushion portion 702 may be one or more extending portions 704 and/or 706 as described and illustrated in relation to FIGS. 7-7C of the disclosure. Additionally, it is within the scope of this disclosure and as a non-limiting example that the one or more second retention portions 703 of the bracket portion 728 may be one or more receiving portions 730 and/or 742 as described and illustrated in relation to FIGS. 7-7C of the disclosure.

As best seen in FIG. 7 of the disclosure and as a non-limiting example, the one or more first extending portions 704 extend outward from at least a portion of the second surface 306 of the outer peripheral surface 282 of the cushion portion 702. The one or more first extending portions 704 have a first end 708, a second end 710, a top surface 712 and a bottom surface 714. Extending outward from at least a portion of the bottom surface 714 of the one or more first extending portions 704 is one or more teeth 716. It is within the scope of this disclosure and as a non-limiting example that the one or teeth 716 of the one or more first extending portions 704 may have a substantially triangular shape, a substantially spherical shape, a substantially rectangular shape, a substantially square shape, a substantially semi-circular shape and/or a substantially egg shape.

In accordance with the embodiment illustrated in FIG. 7A of the disclosure and as a non-limiting example, the one or more second extending portions 706 may extend outward from at least a portion of the fourth surface 310 of the outer peripheral surface 282 of the cushion portion 702. The one or more second extending portions 706 have a first end 718, a second end 720, a top surface 722 and a bottom surface 724. Extending outward from at least a portion of the bottom surface 724 of the one or more second extending portions 706 is one or more teeth 726. It is within the scope of this disclosure and as a non-limiting example that the one or more teeth 726 of the one or more second extending portions 706 may have a substantially triangular shape, a substantially spherical shape, a substantially rectangular shape, a substantially square shape, a substantially semi-circular shape and/or a substantially egg shape.

According to the embodiment illustrated in FIGS. 7 and 7A of the disclosure and as a non-limiting example, the center bearing assembly 700 includes a bracket portion 728. As best seen in FIG. 7A of the disclosure and as a non-limiting example, the bracket portion 728 includes one or more first receiving portions 730 extending from at least a portion of the first surface 320 of the inner surface 312 of the bracket portion 728 to the outer surface 314 of the bracket portion 728. The one or more first receiving portions 730 have a first end 732, a second end 734, a top surface 736 and a bottom surface 738. Additionally, the one or more first receiving portions 730 may be of a size and shape to receive and/or retain at least a portion of the one or more first extending portions 704 on the cushion portion 702 of the center bearing assembly 700.

Extending outward from at least a portion of the bottom surface 738 of the one or more first receiving portions 730 in the bracket portion 728 is one or more teeth 740. The one or more teeth 740 in the one or more first receiving portions 730 of the bracket portion 728 are complementary to and selectively engagable with at least a portion of the one or more teeth 716 of the one or more first extending portions 704 on the cushion portion 702 of the center bearing assembly 700. It is within the scope of this disclosure and as a non-limiting example that the one or more teeth 740 of the one or more first receiving portions 730 may have a substantially triangular shape, a substantially spherical shape, a substantially rectangular shape, a substantially square shape, a substantially semi-circular shape and/or a substantially egg shape.

As best seen in FIG. 7 of the disclosure and as a non-limiting example, the bracket portion 728 may further include one or more second receiving portions 742 extending from at least a portion of the third surface 324 of the inner surface 314 to the outer surface 314 of the bracket portion 728. The one or more second receiving portions 742 have a first end 744, a second end 746, a top surface 748 and a bottom surface 750. Additionally, the one or more second receiving portions 742 may have a size and shape to receive and/or retain at least a portion of the one or more second extending portions 706 on the cushion portion 702 of the center bearing assembly 700.

Extending outward from at least a portion of the bottom surface 750 of the one or more second receiving portions 742 in the bracket portion 728 is one or more teeth 752. The one or more teeth 752 of the one or more second receiving portions 742 in the bracket portion 728 are complementary to and selectively engagable with at least a portion of the one or more teeth 726 of the one or more second extending portions 706 on the cushion portion 702 of the center bearing assembly 700. It is within the scope of this disclosure and as a non-limiting example that the one or more teeth 752 of the one or more second receiving portions 742 may have a substantially triangular shape, a substantially spherical shape, a substantially rectangular shape, a substantially square shape, a substantially semi-circular shape and/or a substantially egg shape.

When the center bearing assembly 700 is in the partially installed position 754 illustrated in FIG. 7B of the disclosure and as a non-limiting example, the one or more teeth 716 and 726 of the one or more first and/or second extending members 704 and/or 706 on the cushion portion 702 are not in direct contact with the one or more teeth 740 and 752 of the first and second receiving portions 730 and 742 in the bracket portion 728. As a result, when in the partially installed position 754, the cushion portion 702 is able to freely rotate, articulate or pivot relative to the bracket portion 728 of the center bearing assembly 700 making the assembly of the various components of the driveline of the vehicle (not shown) easier.

When the center bearing assembly 700 is in the fully installed position 756 illustrated in FIG. 7C of the disclosure and as a non-limiting example, the at least a portion of the one or more teeth 716 and 726 of the one or more first and/or second extending members 704 and/or 706 on the cushion portion 702 are meshingly engaged with at least a portion of the one or more teeth 740 and 752 of the first and second receiving portions 730 and 742 in the bracket portion 728 of the center bearing assembly 700. As a result, when the center bearing assembly 700 is in the fully installed position 756 illustrated in FIG. 7C, the cushion portion 702 is locked and prevented from rotating, articulating or pivoting relative to the bracket portion 728 when in operation. This aids in improving the overall life and durability of the center bearing assembly 700 and the various components of the drivetrain assembly of the vehicle (not shown).

Figures 8, 8A:
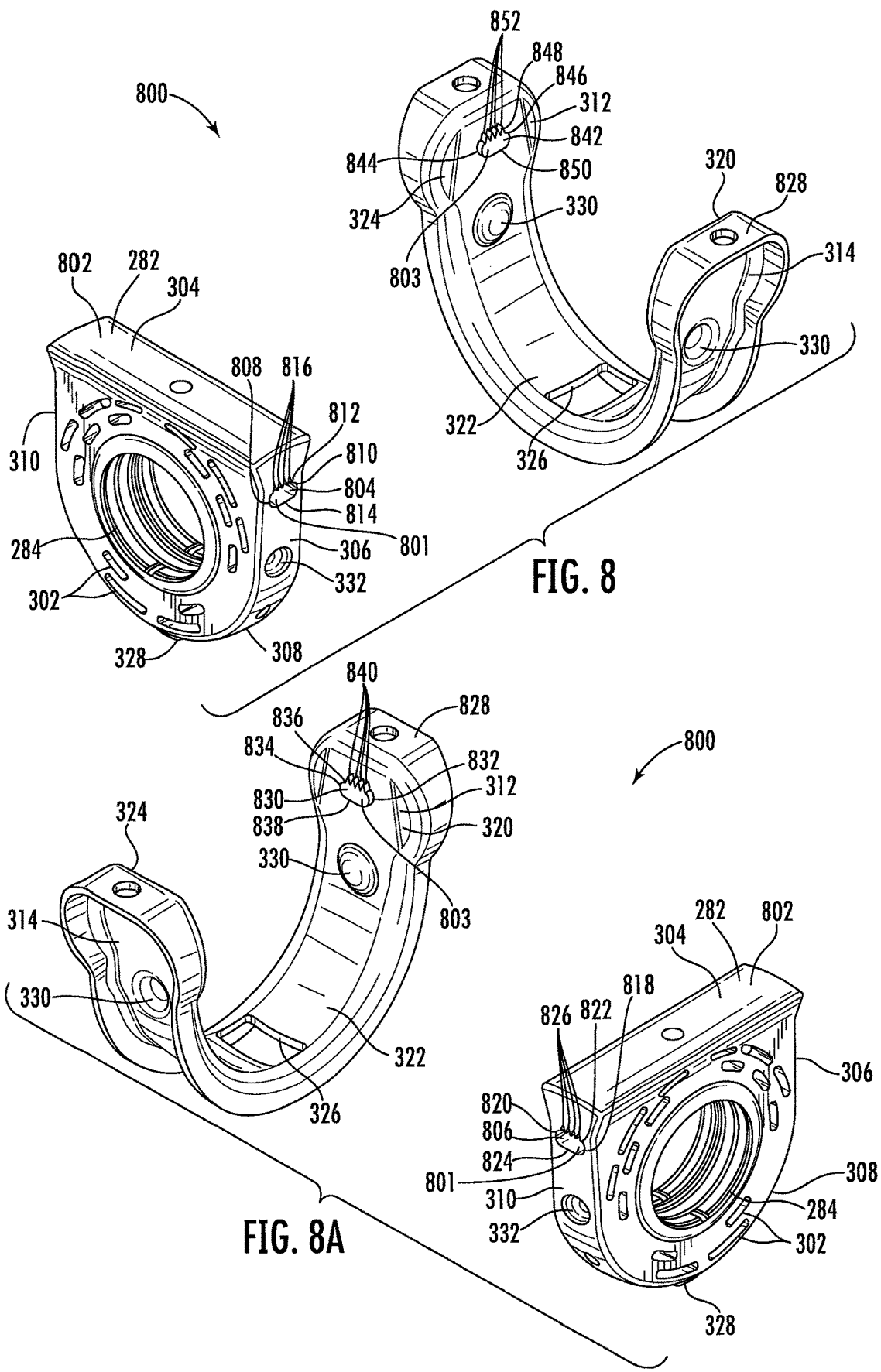
FIG. 8 is a schematic perspective exploded view of a center bearing assembly according to still yet a further embodiment of the disclosure.
FIG. 8A is a schematic perspective exploded view of the center bearing assembly according to the embodiment illustrated in FIG. 8 of the disclosure.
Figure 8B:
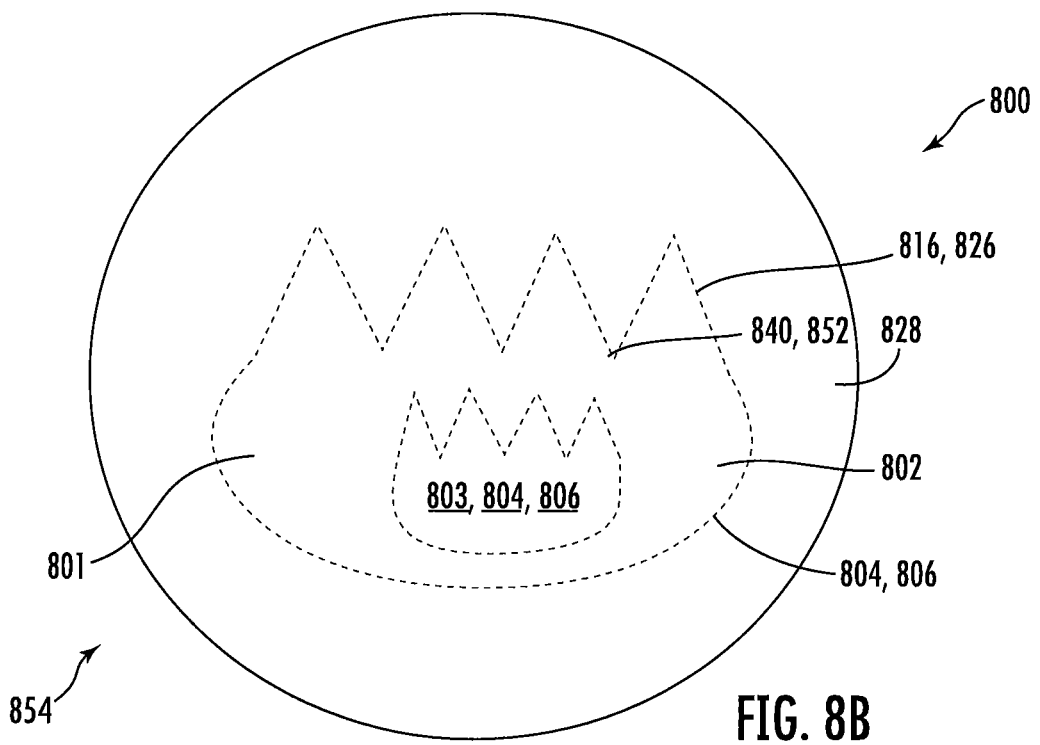
FIG. 8B is a schematic detailed view of a portion of the center bearing assembly illustrated in FIGS. 8 and 8A of the disclosure when the center bearing assembly is a partially installed position.
Figure 8C:
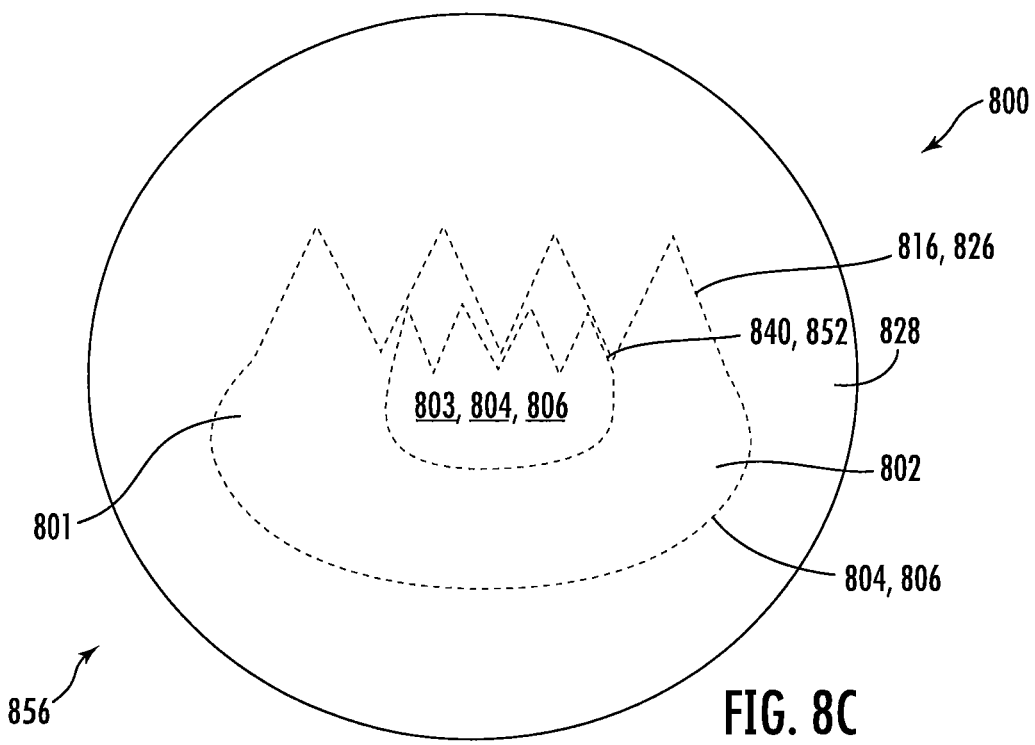
FIG. 8C is a schematic detailed view of a portion of the center bearing assembly illustrated in FIGS. 8-8B of the disclosure when the center bearing assembly is a fully installed position.

FIGS. 8-8C provide a schematic illustration of a center bearing assembly 800 according to still yet another embodiment of the disclosure. The center bearing assembly 800 illustrated in FIGS. 8-8C is the same as the center bearing assemblies 200, 400, 500, 600 and 700 illustrated in FIGS. 3-7C, except where specifically noted below. In accordance with the embodiment illustrated in FIGS. 8 and 8A of the disclosure and as a non-limiting example, the center bearing assembly 800 includes a cushion portion 802 having one or more first receiving portions 804 and one or more second receiving portions 806.

As best seen in FIGS. 8 and 8C of the disclosure and as a non-limiting example, the center bearing assembly 800 may include one or more first retention portions 801 and one or more second retention portions 803. The one or more first and second retention portions 801 and 803 of the center bearing assembly 800 may be used in order to retain at least a portion of the cushion portion 802 relative to the bracket portion 828. When the center bearing assembly 800 is in a first position 854, the cushion portion 802 may be selectively rotatable or movable relative to the bracket portion 828 of the center bearing assembly 800. Additionally, when the center bearing assembly 800 is in a second position 856, at least a portion of the one or more first retention portions 801 of the cushion portion 802 are engaged with at least a portion of the one or more second retention portions 803 of the bracket portion 828 of the center bearing assembly 800. It is within the scope of this disclosure and as a non-limiting example that the first position 854 may be a partially installed position on the vehicle (not shown) and the second position 856 may be a fully installed position on the vehicle (not shown). The interaction and/or engagement between the one or more first and second retention members 801 and 803 of the center bearing assembly 800, aids in preventing the cushion portion 802 from rotating relative to the bracket portion 828. As a result, this aids in reducing and/or eliminating the overall amount of movement experienced by the cushion portion 802 once in the second fully installed position 856 which in turn reduces and/or eliminates the overall amount of NVH in driveline and provides the vehicle (not shown) with superior ride characteristics.

It is within the scope of this disclosure and as a non-limiting example that the one or more first retention portions 801 of the cushion portion 802 may be one or more receiving portions 804 and/or 806 as described and illustrated in relation to FIGS. 8-8C of the disclosure. Additionally, it is within the scope of this disclosure and as a non-limiting example that the one or more second retention portions 803 of the bracket portion 838 may be one or more receiving portions 830 and/or 842 as described and illustrated in relation to FIGS. 8-8C of the disclosure.

As best seen in FIG. 8 of the disclosure and as a non-limiting example, the one or more first receiving portions 804 extend inward into at least a portion of the cushion portion 802 from at least a portion of the second surface 306 of the outer peripheral surface 282 of the cushion portion 802. The one or more first receiving portions 804 have a first end 808, a second end 810, a top surface 812 and a bottom surface 814. Extending outward from at least a portion of the top surface 812 of the one or more first receiving portions 804 in the cushion portion 802 is one or more teeth 816. It is within the scope of this disclosure and as a non-limiting example that the one or teeth 816 of the one or more first receiving portions 804 may have a substantially triangular shape, a substantially spherical shape, a substantially rectangular shape, a substantially square shape, a substantially semi-circular shape and/or a substantially egg shape.

In accordance with the embodiment illustrated in FIG. 8A of the disclosure and as a non-limiting example, the one or more second receiving portions 806 extends inward into at least a portion of the cushion portion 802 from at least a portion of the fourth surface 310 of the outer peripheral surface 282 of the cushion portion 802. The one or more second receiving portions 806 have a first end 818, a second end 820, a top surface 822 and a bottom surface 824. Extending outward from at least a portion of the top surface 822 of the one or more second receiving portions 806 is one or more teeth 826. It is within the scope of this disclosure and as a non-limiting example that the one or more teeth 826 of the one or more second receiving portions 806 may have a substantially triangular shape, a substantially spherical shape, a substantially rectangular shape, a substantially square shape, a substantially semi-circular shape and/or a substantially egg shape.

According to the embodiment illustrated in FIGS. 8 and 8A of the disclosure and as a non-limiting example, the center bearing assembly 800 includes a bracket portion 828. As best seen in FIG. 8A of the disclosure and as a non-limiting example, the bracket portion 828 includes one or more first extending portions 830 extending outward from at least a portion of the first surface 320 of the inner surface 312 of the bracket portion 828 to the outer surface 314 of the bracket portion 828. The first retention portion 830 have a first end 832, a second end 834, a top surface 836 and a bottom surface 838. Additionally, the first retention portion 830 may be of a size and shape to be received and/or retained within at least a portion of the one or more first receiving portions 804 in the cushion portion 802 of the center bearing assembly 800.

Extending outward from at least a portion of the top surface 836 of the one or more first extending portions 830 of the bracket portion 828 is one or more teeth 840. The one or more teeth 840 of the one or more first extending portions 830 on the bracket portion 828 are complementary to and selectively engagable with at least a portion of the one or more teeth 816 of the one or more first receiving portions 804 in the cushion portion 802 of the center bearing assembly 800. It is within the scope of this disclosure and as a non-limiting example that the one or more teeth 840 of the one or more first extending portions 830 may have a substantially triangular shape, a substantially spherical shape, a substantially rectangular shape, a substantially square shape, a substantially semi-circular shape and/or a substantially egg shape.

As best seen in FIG. 8 of the disclosure and as a non-limiting example, the bracket portion 828 may further include one or more second extending portions 842 extend outward from at least a portion of the third surface 324 of the inner surface 314 to the outer surface 314 of the bracket portion 828. The one or more second extending portions 842 have a first end 844, a second end 846, a top surface 848 and a bottom surface 850. Additionally, the one or more second extending portions 842 may be of a size and shape to be received and/or retained within at least a portion of the one or more second receiving portions 806 in the cushion portion 802 of the center bearing assembly 800.

Extending outward from at least a portion of the top surface 848 of the one or more second extending portions 842 on the bracket portion 828 is one or more teeth 852. The one or more teeth 852 of the one or more second extending portions 842 on the bracket portion 828 are complementary to and selectively engagable with at least a portion of the one or more teeth 826 of the one or more second receiving portions 806 in the cushion portion 802 of the center bearing assembly 800. It is within the scope of this disclosure and as a non-limiting example that the one or more teeth 852 of the one or more second extending portions 842 may have a substantially triangular shape, a substantially spherical shape, a substantially rectangular shape, a substantially square shape, a substantially semi-circular shape and/or a substantially egg shape.

When the center bearing assembly 800 is in the partially installed position 854 illustrated in FIG. 8B of the disclosure and as a non-limiting example, the one or more teeth 816 and 826 of the first and second receiving portions 804 and 806 in the cushion portion 802 are not in direct contact with the one or more teeth 840 and 852 of the first and second retaining members 830 and 842 on the bracket portion 828. As a result, when in the partially installed position 854 illustrated in FIG. 8B, the cushion portion 802 is able to freely rotate, articulate or pivot relative to the bracket portion 828 of the center bearing assembly 800 making the assembly of the various components of the driveline of the vehicle (not shown) easier.

When the center bearing assembly 800 is in the fully installed position 856 illustrated in FIG. 8C of the disclosure and as a non-limiting example, the at least a portion of the one or more teeth 816 and 826 of the first and second receiving portions 804 and 806 in the cushion portion 802 are meshingly engaged with at least a portion of the one or more teeth 840 and 852 of the one or more first and/or second extending members 830 and/or 842 on the bracket portion 828 of the center bearing assembly 800. As a result, when the center bearing assembly 800 is in the fully installed position 856 illustrated in FIG. 8C, the cushion portion 802 is locked and prevented from rotating, articulating or pivoting relative to the bracket portion 828 when in operation. This aids in improving the overall life and durability of the center bearing assembly 800 and the various components of the drivetrain assembly of the vehicle (not shown).

FIGS. 9-9B provide a schematic illustration of a center bearing assembly 900 according to still even yet another embodiment of the disclosure. The center bearing assembly 900 illustrated in FIGS. 9-9B is the same as the center bearing assemblies 300, 400, 500, 600, 700 and 800, except where specifically noted below. As illustrated in FIGS. 9A and 9B of the disclosure and as a non-limiting example, the center bearing assembly 900 utilizes the cushion portion 268 described and illustrated in relation to FIGS. 3-3E of the disclosure.

As best seen in FIGS. 9-9B of the disclosure and as a non-limiting example, the center bearing assembly 900 may include the one or more first retention portions 331 and one or more second retention portions 901. The one or more first and second retention portions 331 and 901 of the center bearing assembly 900 may be used in order to retain at least a portion of the cushion portion 268 relative to the bracket portion 902. When the center bearing assembly 900 is in a first position 520 illustrated in FIG. 9A, the cushion portion 268 may be selectively rotatable or movable relative to the bracket portion 902 of the center bearing assembly 900. Additionally, when the center bearing assembly 900 is in a second position 522 illustrated in FIG. 9B, at least a portion of the one or more first retention portions 331 of the cushion portion 268 are engaged with at least a portion of the one or more second retention portions 901 of the bracket portion 902 of the center bearing assembly 900. It is within the scope of this disclosure and as a non-limiting example that the first position 520 may be a partially installed position on the vehicle (not shown) and the second position 522 may be a fully installed position on the vehicle (not shown). The interaction and/or engagement between the one or more first and second retention members 331 and 901 of the center bearing assembly 900, aids in preventing the cushion portion 268 from rotating relative to the bracket portion 902. As a result, this aids in reducing and/or eliminating the overall amount of movement experienced by the cushion portion 268 once in the second fully installed position 522 which in turn reduces and/or eliminates the overall amount of NVH in driveline and provides the vehicle (not shown) with superior ride characteristics.

It is within the scope of this disclosure and as a non-limiting example that the one or more first retention portions 331 of the cushion portion 268 may be one or more extending portions 336 and/or 356 as described and illustrated in relation to FIGS. 3-3E of the disclosure. Additionally, it is within the scope of this disclosure and as a non-limiting example that the one or more second retention portions 901 of the bracket portion 902 may be one or more receiving portions 904 and/or 906 as described and illustrated in relation to FIGS. 9-9B of the disclosure.

In accordance with the embodiment illustrated in FIGS. 9-9B of the disclosure and as a non-limiting example, the center bearing assembly 900 may include a bracket portion 902 having one or more first receiving portions 904 in the first surface 320 and one or more second receiving portions 906 third surface 324 of the inner surface 312 of the bracket portion 902. As illustrated in FIGS. 9-9B of the disclosure and as a non-limiting example, the one or more first receiving portions 904 in the bracket portion 902 may include the one or more radially extending portions 508 and the one or more second receiving portions 906 may include the one or more radially extending portions 514 described and illustrated in relation to FIGS. 5-5B. This provides the first and second receiving portions 904 and 906 with the one or more articulation portions 510 and 516 and the one or more locking portions 512 and 518 described previously herein.

As best seen in FIG. 9A of the disclosure and as a non-limiting example, the one or more radially extending portions 508 and 514 of the first and second receiving portions 904 and 906 may be disposed substantially parallel to and/or at an angle θ relative to the radial centerline RC1 of the one or more bearing assemblies 272 of the center bearing assembly 900. This aids in ensuring that at least a portion of the one or more first and/or second extending members 336 and/or 356 are received within at least a portion of the one or more locking portions 512 and 518 of the first and second receiving portions 904 and 906, even when the cushion portion 268 is installed at an angle relative to the radial centerline RC1. As a result, this aids in providing a more robust center bearing assembly 900 that is always able to lock and prevent the cushion portion 268 from rotating, pivoting or articulating relative to the bracket portion 902 no matter how the cushion portion 268 is positioned when transitioning from the partially installed position 520 to the fully installed position 522 illustrated in FIGS. 9A and 9B of the disclosure. It is within the scope of this disclosure and as a non-limiting example that the first and second receiving portions 904 and 906 in the bracket portion 902 may be substantially M-shaped.

FIGS. 10 and 10A provide a schematic perspective exploded vide of a center bearing assembly 1000 according to a further embodiment of the disclosure. The center bearing assembly 1000 illustrated in FIGS. 10 and 10A is the same as the center bearing assemblies 300, 400, 500, 600, 700, 800 and 900, except where specifically noted below. As illustrated in FIGS. 10 and 10A of the disclosure and as a non-limiting example, the center bearing assembly 1000 utilizes the bracket portion 404 described and illustrated in relation to FIGS. 4-4C, 6 and 6A of the disclosure.

As best seen in FIGS. 10 and 10A of the disclosure and as a non-limiting example, the center bearing assembly 1000 may include one or more first retention portions 1001 and the one or more second retention portions 403. The one or more first and second retention portions 1001 and 403 of the center bearing assembly 1000 may be used in order to retain at least a portion of the cushion portion 1002 relative to the bracket portion 404. When the center bearing assembly 1000 is in a first position (not shown), the cushion portion 1002 may be selectively rotatable or movable relative to the bracket portion 404 of the center bearing assembly 1000. Additionally, when the center bearing assembly 1000 is in a second position (not shown), at least a portion of the one or more first retention portions 1001 of the cushion portion 1002 are engaged with at least a portion of the one or more second retention portions 403 of the bracket portion 404 of the center bearing assembly 1000. It is within the scope of this disclosure and as a non-limiting example that the first position (not shown) may be a partially installed position on the vehicle (not shown) and the second position (not shown) may be a fully installed position on the vehicle (not shown). The interaction and/or engagement between the one or more first and second retention members 1001 and 403 of the center bearing assembly 1000, aids in preventing the cushion portion 1002 from rotating relative to the bracket portion 404. As a result, this aids in reducing and/or eliminating the overall amount of movement experienced by the cushion portion 1002 once in the second fully installed position (not shown) which in turn reduces and/or eliminates the overall amount of NVH in driveline and provides the vehicle (not shown) with superior ride characteristics.

It is within the scope of this disclosure and as a non-limiting example that the one or more first retention portions 1001 of the cushion portion 1002 may be one or more receiving portions 1004 and/or 1006 as described and illustrated in relation to FIGS. 10 and 10A of the disclosure.

In accordance with the embodiment illustrated in FIGS. 10 and 10A of the disclosure and as a non-limiting example, the center bearing assembly 1000 may include a cushion portion 1002 having one or more first receiving portions 1004 in the second surface 306 and one or more second receiving portions 1006 in the fourth surface 310 of the outer peripheral surface 282 of the cushion portion 1002. As illustrated in FIGS. 10 and 10A of the disclosure and as a non-limiting example, the one or more first receiving portions 1004 in the cushion portion 1002 may include the one or more radially extending portions 608 and the one or more second receiving portions 1006 may include the one or more radially extending portions 614 as described and illustrated in relation to FIGS. 6 and 6A. This provides the first and second receiving portions 1004 and 1006 with the one or more articulation portions 610 and 616 and the one or more locking portions 612 and 618 defined by the one or more radially extending portions 608 and 614 described previously herein.

As best seen in FIGS. 10 and 10A of the disclosure and as a non-limiting example, the one or more radially extending portions 608 and 614 of the first and second receiving portions 1004 and 1006 may be disposed substantially parallel to and/or at an angle θ relative to the radial centerline RC1 of the one or more bearing assemblies 272 of the center bearing assembly 1000. This aids in ensuring that at least a portion of the one or more first and/or second extending members 408 and/or 428 are received within at least a portion of the one or more locking portions 612 and 618 of the first and second receiving portions 1004 and 1006, even when the cushion portion 1002 is installed at an angle relative to the radial centerline RC1. As a result, this aids in providing a more robust center bearing assembly 1000 that is always able to lock and prevent the cushion portion 1002 from rotating, pivoting or articulating relative to the bracket portion 404 no matter how the cushion portion 1002 is positioned when transitioning from a partially installed position (not shown) to a fully installed position (not shown). It is within the scope of this disclosure and as a non-limiting example that the first and second receiving portions 1004 and 1006 in the cushion portion 1002 may be substantially W-shaped.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A center bearing assembly, comprising:
   a bearing assembly;
   a cushion portion;

wherein at least a portion of said bearing assembly is at least one of received and retained within at least a portion of said cushion portion;
wherein said cushion portion has at least one extending portion extending outward from at least a portion of an outer peripheral surface of said cushion portion;
a bracket portion;
wherein an inner surface of said bracket portion has a shape that is complementary to at least a portion of said outer peripheral surface of said cushion portion;
wherein said bracket portion has at least one receiving portion, said at least one receiving portion comprises at least one articulation portion and at least one radially extending portion extending from the articulation portion, said at least one radially extending portion extending from said inner surface to an outer surface of said bracket portion; and
wherein said at least one receiving portion is of a size and shape to at least one of receive and retain at least a portion of said at least one extending portion therein.

2. The center bearing assembly of claim 1, wherein said at least one articulation portion in said bracket portion extends along a radius relative to a plane (P1) that extends substantially perpendicular through an axial centerline (AC1) of said bearing assembly.

3. The center bearing assembly of claim 1, wherein in an installed position, at least a portion of said at least one extending portion on said cushion portion is in direct contact with said at least one radially extending portion in said bracket portion thereby locking said cushion portion in place and preventing said cushion portion from rotating.

4. The center bearing assembly of claim 1, wherein said at least one extending portion on said cushion portion is disposed a distance from a first substantially horizontal surface of said outer peripheral surface of said cushion portion such that when said cushion portion is in an installed position, at least a portion of said at least one extending portion on said cushion portion is in direct contact with said at least one radially extending portion in said bracket portion.

5. The center bearing assembly of claim 1, wherein said at least one receiving portion in said bracket portion is at least one of substantially T-shaped, substantially upside down T-shaped, substantially W-shaped, and substantially M-shaped.

6. The center bearing assembly of claim 1, wherein when at least a portion of said at least one extending portion on said cushion portion is disposed within said at least one articulation portion in said bracket portion said cushion portion is able to articulate; and
wherein when at least a portion of said at least one extending portion on said cushion portion is disposed within said at least one radially extending portion in said bracket portion said cushion portion is locked in place and prevented from rotating or articulating.

7. The center bearing assembly of claim 1, wherein said at least one extending portion of said cushion portion has one or more teeth extending outward therefrom; and
wherein said at least one radially extending portion comprises a plurality of radially extending portions extending from said at least one articulation portion, the plurality of radially extending portions being complementary to and selectively engagable with at least a portion so said one or more teeth of said at least one extending portion on said cushion portion.

8. A center bearing assembly, comprising:
a bearing assembly;
a cushion portion;
wherein at least a portion of said bearing assembly is at least one of received and retained within at least a portion of said cushion portion;
wherein said cushion portion has at least one receiving portion, said at least one receiving portion comprises at least one articulation portion and at least one radially extending portion extending from the articulation portion, said at least one radially extending portion extending inward into said cushion portion from at least a portion of an outer peripheral surface of said cushion portion;
a bracket portion;
wherein an inner surface of said bracket portion has a shape that is complementary to at least a portion of said outer peripheral surface of said cushion portion; and
wherein said bracket portion has at least one extending portion extending outward from said inner surface of said bracket portion; and
wherein said at least one receiving portion in said cushion portion is of a size and shape to at least one of receive and retain at least a portion of said at least one extending portion therein.

9. The center bearing assembly of claim 8, wherein said at least one articulation portion in said cushion portion extend along a radius relative to a plane (P1) that extends substantially perpendicular through an axial centerline (AC1) of said bearing assembly.

10. The center bearing assembly of claim 8, wherein in an installed position, at least a portion of said at least one extending portion on said bracket portion are in direct contact with said at least one radially extending portion in said cushion portion thereby locking said cushion portion in place and preventing said cushion portion from rotating.

11. The center bearing assembly of claim 8, wherein said at least one extending portion on said bracket portion is disposed a distance from a first substantially horizontal surface of said outer peripheral surface of said cushion portion such that when said cushion portion is in an installed position, at least a portion of said at least one extending portion on said bracket portion is in direct contact with said at least one radially extending portion in said cushion portion.

12. The center bearing assembly of claim 8, wherein said at least one receiving portion in said cushion portion is at least one of substantially T-shaped, substantially upside down T-shaped, substantially W-shaped, and substantially M-shaped.

13. The center bearing assembly of claim 8, wherein when at least a portion of said at least one extending portion on said bracket portion is disposed within said at least one articulation portion in said cushion portion said cushion portion is able to articulate; and
wherein when at least a portion of said at least one extending portion on said bracket portion is disposed within said at least one radially extending portion in said cushion portion said cushion portion is locked in place and prevented from rotating or articulating.

14. The center bearing assembly of claim 8, wherein said at least one extending portion of said bracket portion have one or more teeth extending outward therefrom; and
wherein said at least one radially extending portion comprises a plurality of radially extending portions extending from said at least one articulation portion, the plurality of radially extending portions being complementary to and selectively engagable with at least a portion so said one or more teeth of said at least one extending portion on said bracket portion.

15. A center bearing assembly, comprising:

a bearing assembly;

a cushion portion;

wherein at least a portion of said bearing assembly is at least one of received and retained within at least a portion of said cushion portion;

wherein said cushion portion has at least one extending portion extending outward from at least a portion of an outer peripheral surface of said cushion portion;

a bracket portion;

wherein an inner surface of said bracket portion has a shape that is complementary to at least a portion of said outer peripheral surface of said cushion portion;

wherein said bracket portion has at least one receiving portion extending from said inner surface to an outer surface of said bracket portion;

wherein said at least one receiving portion is of a size and shape to at least one of receive and retain at least a portion of said at least one extending portion therein; and wherein said at least one receiving portion has one or more teeth that are selectively engagable with at least a portion of said at least one extending portion.

16. The center bearing assembly of claim 15, wherein when said one or more teeth of said at least one receiving portion in said bracket portion are not in direct contact with at least a portion of said at least one extending portion of said cushion portion said cushion portion is able to articulate; and wherein when said one or more teeth of said at least one receiving portion in said bracket portion are in direct contact with at least a portion of said at least one extending portion of said cushion portion said cushion portion is locked in place and prevented from rotating or articulating.

17. The center bearing assembly of claim 15, wherein said at least one extending portion on said cushion portion has one or more teeth that are complementary to and selectively engagable with at least a portion of said one or more teeth of said at least one receiving portion in said bracket portion.

18. The center bearing assembly of claim 17, wherein when said one or more teeth of said at least one receiving portion in said bracket portion are not in direct contact with at least a portion of said one or more teeth of said at least one extending portion of said cushion portion said cushion portion is able to articulate; and wherein when said one or more teeth of said at least one receiving portion in said bracket portion are in direct contact with at least a portion of said one or more teeth of said at least one extending portion of said cushion portion said cushion portion is locked in place and prevented from rotating or articulating.

\* \* \* \* \*